US012207621B2

(12) United States Patent
Tuthill et al.

(10) Patent No.: US 12,207,621 B2
(45) Date of Patent: Jan. 28, 2025

(54) CLAMP

(71) Applicant: Hebe Studio Ltd., Wardington (GB)

(72) Inventors: James Tuthill, Oxford (GB); Simon Nicholls, Daventry Northants (GB); Johannes Paul, London (GB); William Windham, Banbury (GB)

(73) Assignee: HEBE STUDIO LTD., Wardington (GB)

( * ) Notice: Subject to any disclaimer, the term of this patent is extended or adjusted under 35 U.S.C. 154(b) by 246 days.

(21) Appl. No.: 17/794,189

(22) PCT Filed: Oct. 1, 2020

(86) PCT No.: PCT/EP2020/077567
§ 371 (c)(1),
(2) Date: Jul. 20, 2022

(87) PCT Pub. No.: WO2021/064125
PCT Pub. Date: Apr. 8, 2021

(65) Prior Publication Data
US 2023/0083124 A1    Mar. 16, 2023

(30) Foreign Application Priority Data

Oct. 2, 2019  (GB) .................................... 1914230
Oct. 3, 2019  (GB) .................................... 1914281

(51) Int. Cl.
*A01K 1/02*     (2006.01)
*A01K 31/08*    (2006.01)

(52) U.S. Cl.
CPC ............ *A01K 1/0245* (2013.01); *A01K 31/08* (2013.01)

(58) Field of Classification Search
CPC .... A01K 31/08; A01K 1/0245; A01K 1/0035; A01K 1/033; A01K 1/034; A01K 31/002;
(Continued)

(56) References Cited

U.S. PATENT DOCUMENTS 3,323,820 A    6/1967  Braccini
4,009,543 A *  3/1977  Smrt ..................... E04B 1/3211
                                                52/81.3
(Continued)

FOREIGN PATENT DOCUMENTS

JP        3093793 U    5/2003

OTHER PUBLICATIONS

International Search Report, PCT/EP202077567, European Patent Office, Mar. 30, 2021, 5 pages.

*Primary Examiner* — Brady W Frazier
*Assistant Examiner* — Zoe Tam Tran
(74) *Attorney, Agent, or Firm* — Taft Stettinius & Hollister LLP; Stephen F. Rost

(57) ABSTRACT

A first implementation provides a clamp (10; 110; 210; 310) for connecting a plurality of wire mesh panels together, the clamp comprising a base (14; 114; 214; 314), a cap (12; 112; 212; 312) releasably attachable to the base, and a plurality of arms (18, 118, 218, 318) provided between the base and the cap to define a plurality of channels (500) within the clamp; wherein each said channel is configured to accommodate a portion of a loop of a respective one of said plurality of panels to connect the panels together. Another implementation provides a clamp (511a, 511b) for connecting a plurality of wire mesh panels together, the clamp comprising first and second elongate panels (515, 517) that are releasably coupled to another by a fixing (519), the elongate panels cooperating to provide a first channel (537) into which a portion of a first wire mesh panel can be push-fitted and a second channel (539) into which a portion of a second wire mesh panel can be push-fitted, the clamp further comprising a first retainer (514a) operable to retain said portion of said first wire mesh panel in said first channel (537), and a second retainer (541c) operable to retain said (Continued)

portion of said second wire mesh panel in said second channel (539).

19 Claims, 22 Drawing Sheets

(58) Field of Classification Search
CPC ....... A01K 31/06; A01K 31/07; F16B 5/0621; F16B 5/0642; F16B 2005/0678
USPC .................................................. 119/496, 474
See application file for complete search history.

(56) References Cited

U.S. PATENT DOCUMENTS

| | | | | |
|---|---|---|---|---|
| 4,194,851 | A * | 3/1980 | Littlefield | ............. E04B 1/3211 |
| | | | | 52/81.3 |
| 4,736,551 | A * | 4/1988 | Higson | ................... E04B 7/105 |
| | | | | 403/171 |
| 4,902,181 | A * | 2/1990 | Moulton | ............... F16B 19/002 |
| | | | | 411/347 |
| 10,053,855 | B2 * | 8/2018 | Yonkers | .................. B65D 65/38 |
| 11,486,129 | B1 * | 11/2022 | Garvey | ..................... F16B 2/04 |
| 2002/0117118 | A1 | 8/2002 | Marchioro | |
| 2013/0183086 | A1 * | 7/2013 | Wang | ..................... F16B 5/0642 |
| | | | | 403/327 |
| 2014/0105707 | A1 * | 4/2014 | Tseng | ...................... F16B 21/04 |
| | | | | 411/508 |
| 2016/0340911 | A1 * | 11/2016 | Jean | ...................... F16B 37/044 |
| 2017/0122350 | A1 | 5/2017 | Link | |
| 2018/0342974 | A1 * | 11/2018 | Jasmin | .................. F24S 25/636 |
| 2020/0015449 | A1 * | 1/2020 | Volin | ................... A01K 1/0107 |

* cited by examiner

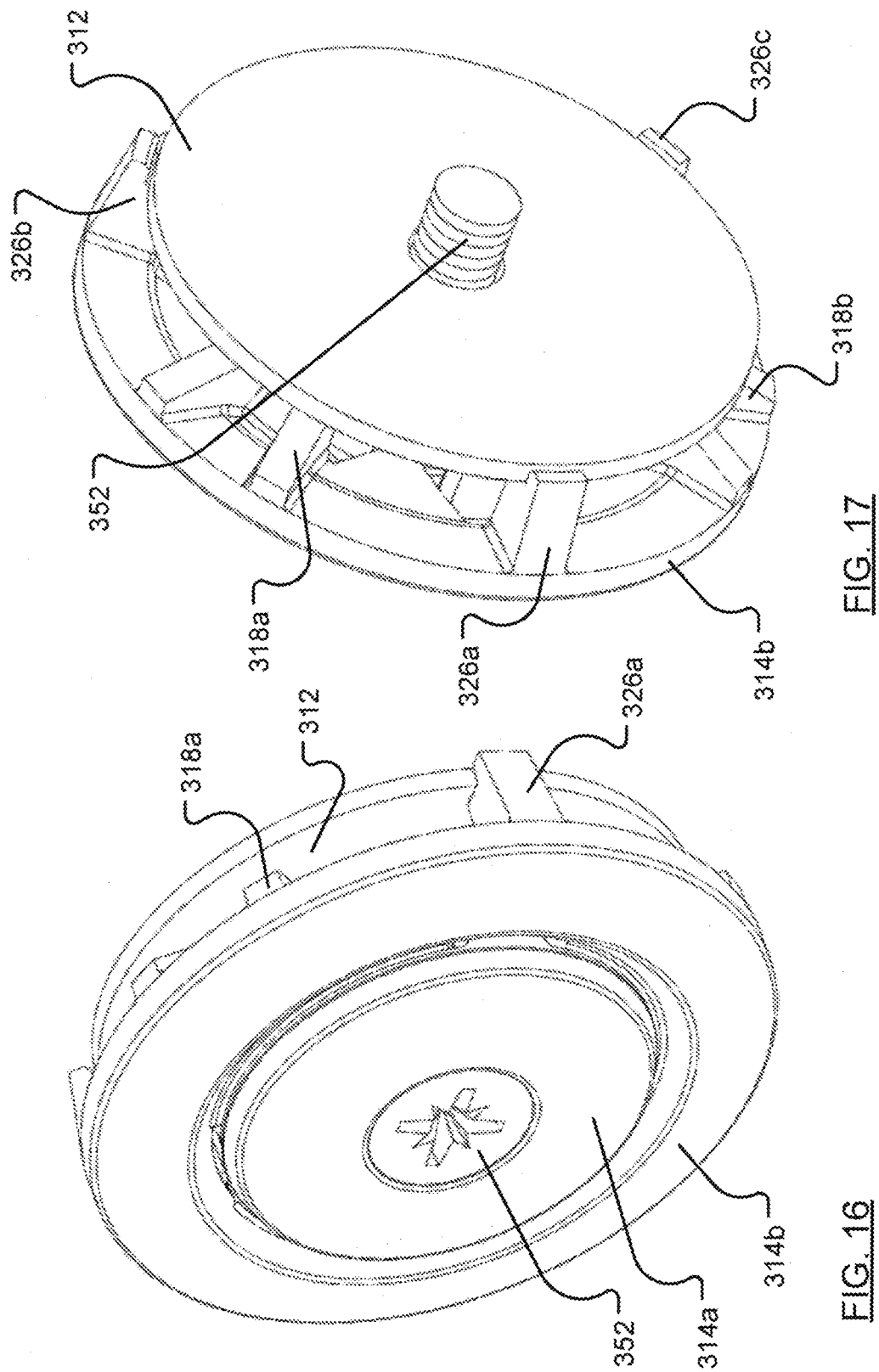

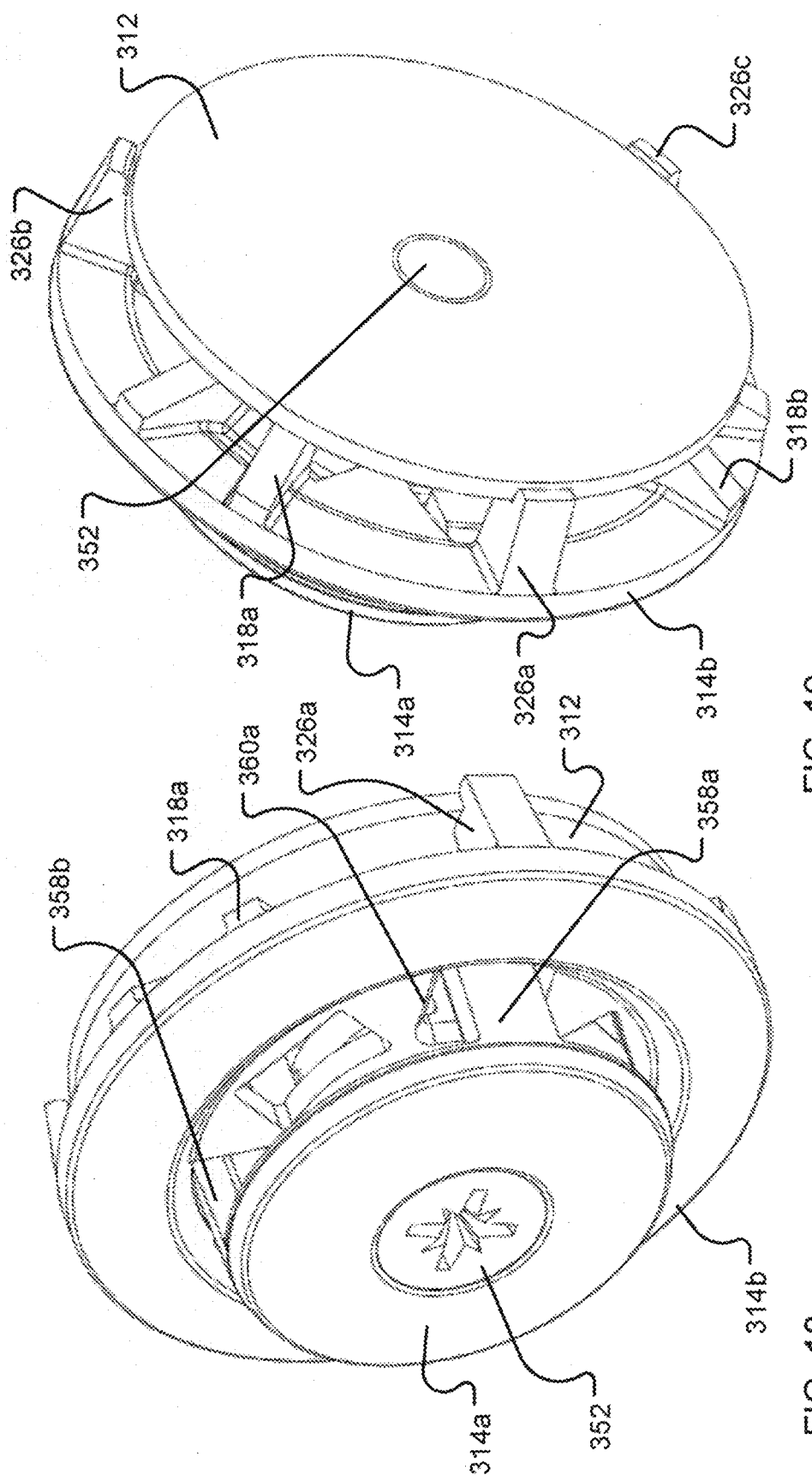

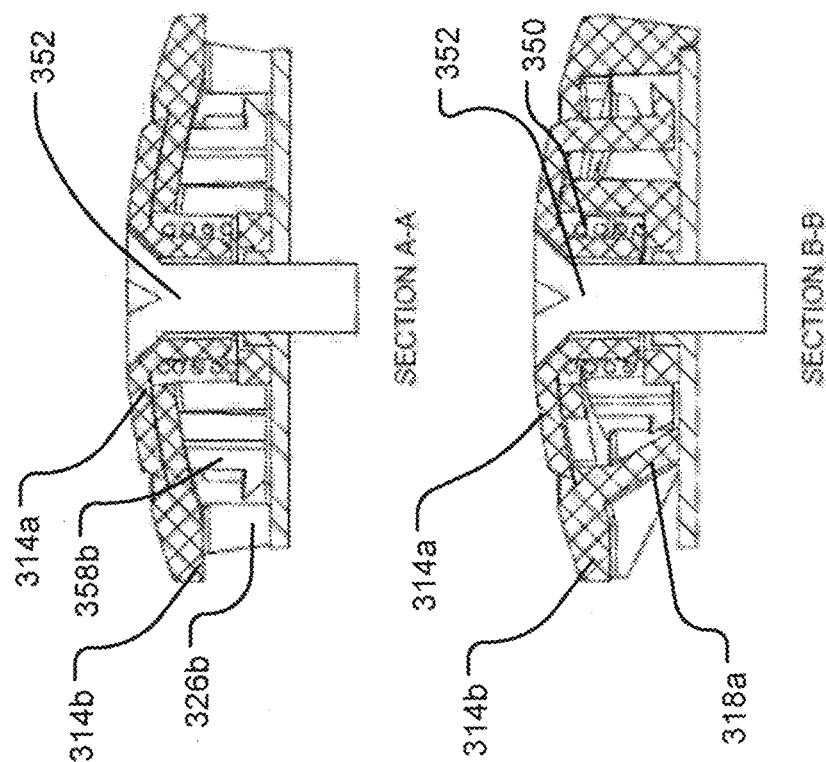
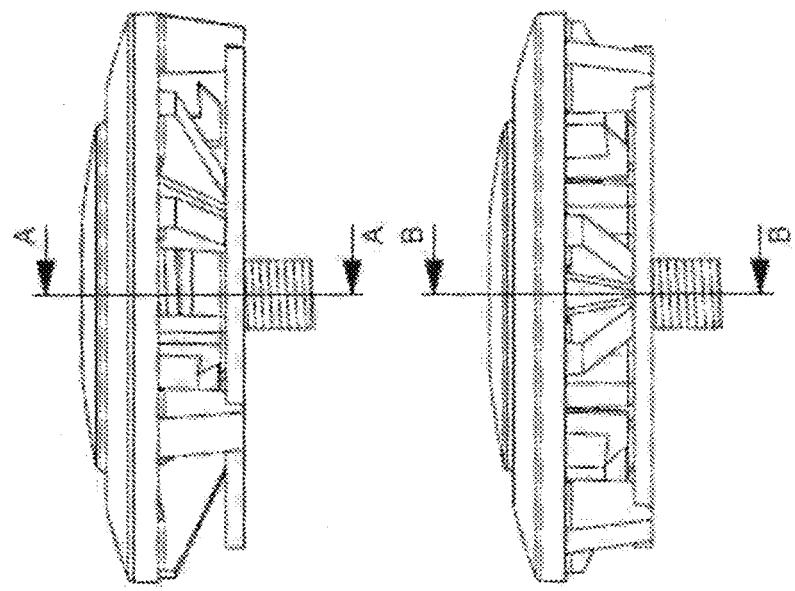
FIG. 21
FIG. 22

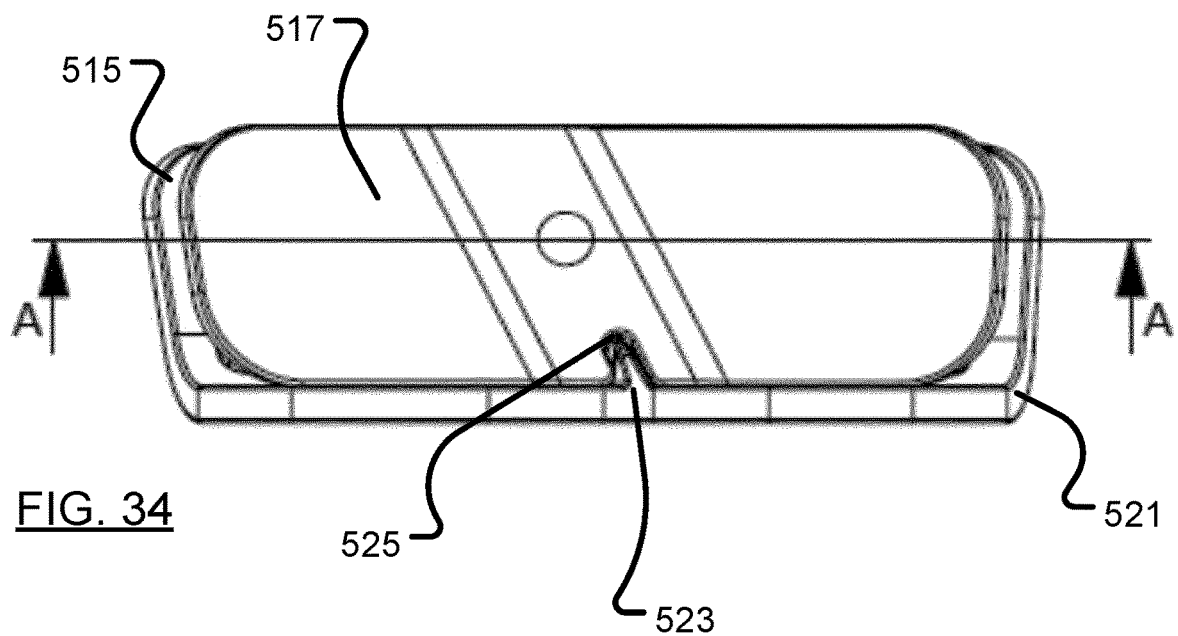
FIG. 34
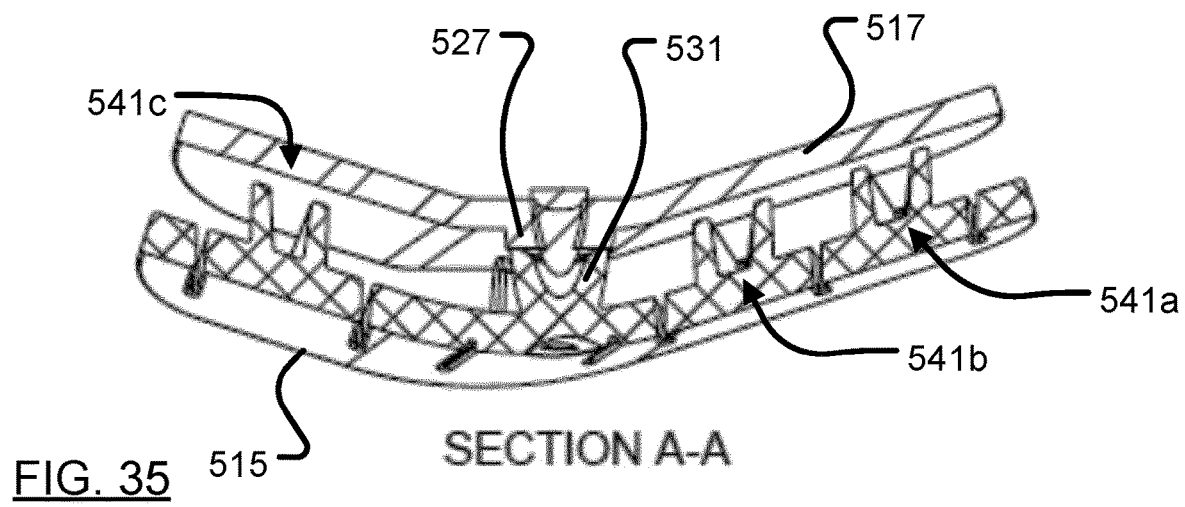
FIG. 35   SECTION A-A

CLAMP

FIELD

This disclosure relates to clamps, for example to clamps for coupling together wire mesh panels of an animal cage. In one illustrative arrangement, the clamp may be used to enable users to construct an animal cage in the form of a geodesic dome.

The clamps disclosed below are described with particular reference to their use in connection with the assembly of an animal cage in the form of a geodesic dome, but it will be appreciated by persons skilled in the art that the clamps disclosed herein may be used in a variety of other applications and/or to construct other types of cage, and hence that the present disclosure should not be interpreted as being limited only to the use of such clamps in the assembly of animal cages, or indeed animal cages in the form of a geodesic dome.

BACKGROUND

It has previously been proposed to keep animals in wire mesh cages. Due to packaging constraints, such wire mesh cages may be provided as a number of separate wire mesh panels, which are then assembled together to form a cage.

In our UK Patent No. 2563317 we have disclosed a geodesic dome animal cage comprised of a plurality of hexagonal and pentagonal panels. We have also disclosed, in our European Patent No. 3211251, a ring clip that can be used (inter alia) to couple the aforementioned panels of the geodesic dome together.

Whilst the clip disclosed in our European Patent does enable the panels to be coupled together to form a geodesic dome, it can be time consuming for users—particularly those who are assembling the cage on their own—to assemble the cage as panels that are coupled together by such a clip can pivot relative to one another. U.S. Pat. No. 3,323,820 discloses a clamp that prevents clamped elements from moving relative to one another, but this arrangement is not suitable for use with wire mesh panels.

The clamps disclosed herein have been devised with the foregoing in mind.

SUMMARY

In accordance with a presently preferred embodiment of the present invention, there is provided a clamp for connecting a plurality of wire mesh panels together, the clamp comprising a base; a cap releasably attachable to the base, and a plurality of arms provided between the base and the cap to define a plurality of channels within the clamp; wherein each said channel is configured to accommodate a portion of a loop of a respective one of said plurality of panels to connect the panels together.

The clamp may comprise a plurality of spacers provided between the base and the cap and arranged so that each arm has a spacer to either side of the arm in a circumferential direction. In one implementation each said arm co-operates with spacers to either side of the arm in a circumferential direction to define a said channel.

The base may be releasably attachable to the cap by means of a snap fit mechanism. The snap fit mechanism may comprise a resilient protrusion defined in the base or the cap and an aperture defined in the other of the base and the cap.

The arms may include a ramped radially inwardly extending and radially outwardly facing face.

The base and the cap may be releasably attachable by means of a threaded connection. The arms may include radially reinforcing walls. The clamp may comprise three spacers, the three spacers extending axially from the base or the cap. The three spacers may extend axially to the same extent as the three arms. Each spacer may be provided adjacent an arm and each arm and spacer is separated circumferentially by a distance d, the distance d being larger than a diameter Ø of the portion of the loop of the panel. Each arm and/or each spacer may terminate in at least one circumferential tab, such that each arm and each spacer is also separated circumferentially by a distance c, wherein the distance c is between 1 and 1.2 times the diameter Ø of the portion of the loop of the panel.

The base may comprise a minor base portion and a major base portion, a resilient bias being provided between said major and minor base portions so that said major base portion can move towards said minor base portion against said bias.

The clamp may include a fixing for coupling said minor base portion to said cap, the fixing extending through said resilient bias and said major base portion.

In one implementation, wherein tightening the fixing draws the minor base portion and the major base portion towards the cap and compresses the resilient bias.

In one aspect there is provided a wire mesh cage including a plurality of panels coupled together by a clamp of the type described herein. The panels may form a geodesic dome. The geodesic dome may include a plurality of hexagonal and/or pentagonal panels. The cage may further comprise a base that is configured to be coupled to the cage to form an enclosure.

Another envisaged arrangement provides a clamp for connecting three wire mesh panels the clamp comprising a base and a cap, the base being releasably attachable to the cap, the base defining three arms extending axially between the base and the cap such that a portion of a loop of each of the three panels may be arranged to pass between the base and the cap and around a respective one of each of the three arms, so as to clamp together the three panels.

In another presently envisaged implementation, there is provided a clamp for connecting a plurality of wire mesh panels together, the clamp comprising first and second elongate panels that are releasably coupled to one another by a fixing, the elongate panels cooperating to provide a first channel into which a portion of a first wire mesh panel can be fitted and a second channel into which a portion of a second wire mesh panel can be fitted, the clamp further comprising a first retainer operable to retain said portion of said first wire mesh panel in said first channel, and a second retainer operable to retain said portion of said second wire mesh panel in said second channel.

The first panel may include a ledge extending from a face of the first elongate panel towards said second elongate panel. The ledge may include a locating formation operable to co-operate with a locating formation included in said second elongate panel to locate the second elongate panel with respect to the first elongate portion.

The first and second retainers may each be operable to retain the first and second wire mesh panel portions respectively in a gap between each said retainer and the ledge.

Each said retainer may be able to move between a first position where access to said gap is obstructed and a second position where access to said gap is enabled. Insertion of a wire mesh panel into a said channel may urge the retainer associated with said channel to move between said first and second positions. Each said retainer may be resiliently moveable between said first and second positions.

Each said retainer may comprise a ramped body having a first height relative to one of said first and second panels at a point proximate an entrance to the channel with which the retainer is associated, and a greater height at a point distal from the entrance to the channel. The retainers may extend from said first panel into the channels with which they are associated.

Each said retainer may be partly circumscribed by a slot, so that at least part of the retainer can move into and out of the plane of the first panel.

In one implementation, the fixing may divide said first channel from said second.

The clamp may comprise a third retainer associated with said first or said second channel. The clamp may comprise a spacer operable to space the first and second elongate panels. In one envisaged implementation, the fixing extends through the spacer.

Another envisaged implementation provides a kit for constructing an animal cage, the kit comprising a plurality of wire mesh panels, and a plurality of clamps as described herein. Some of said plurality of wire mesh panels may comprise hexagonal wire mesh panels. Some of said plurality of wire mesh panels may comprise pentagonal wire mesh panels. Some of said plurality of wire mesh panels may comprise trapezoidal wire mesh panels. In one implementation the panels and said clamps may be assembled to form an animal cage in the form of a geodesic dome.

BRIEF DESCRIPTION OF THE DRAWINGS

Various aspects of the teachings of the present invention, and arrangements embodying those teachings, will hereafter be described by way of illustrative example with reference to the accompanying drawings, in which:

FIGS. 16 and 17 are front and rear isometric views, respectively, of a clamp according to a fifth embodiment in a secured configuration;

FIGS. 18 and 19 are front and rear isometric views, respectively, of the clamp depicted in FIGS. 16 and 17 is a partly released configuration;

FIGS. 21 and 22 are cross-sectional views of the clamp in a secured configuration along the lines A-A and B-B respectively;

FIG. 34 is a schematic rear elevation of the clamp shown in FIGS. 31 to 33;

FIG. 35 is a cross-sectional view along the line A-A in FIG. 34;

DETAILED DESCRIPTION

Figure 1:
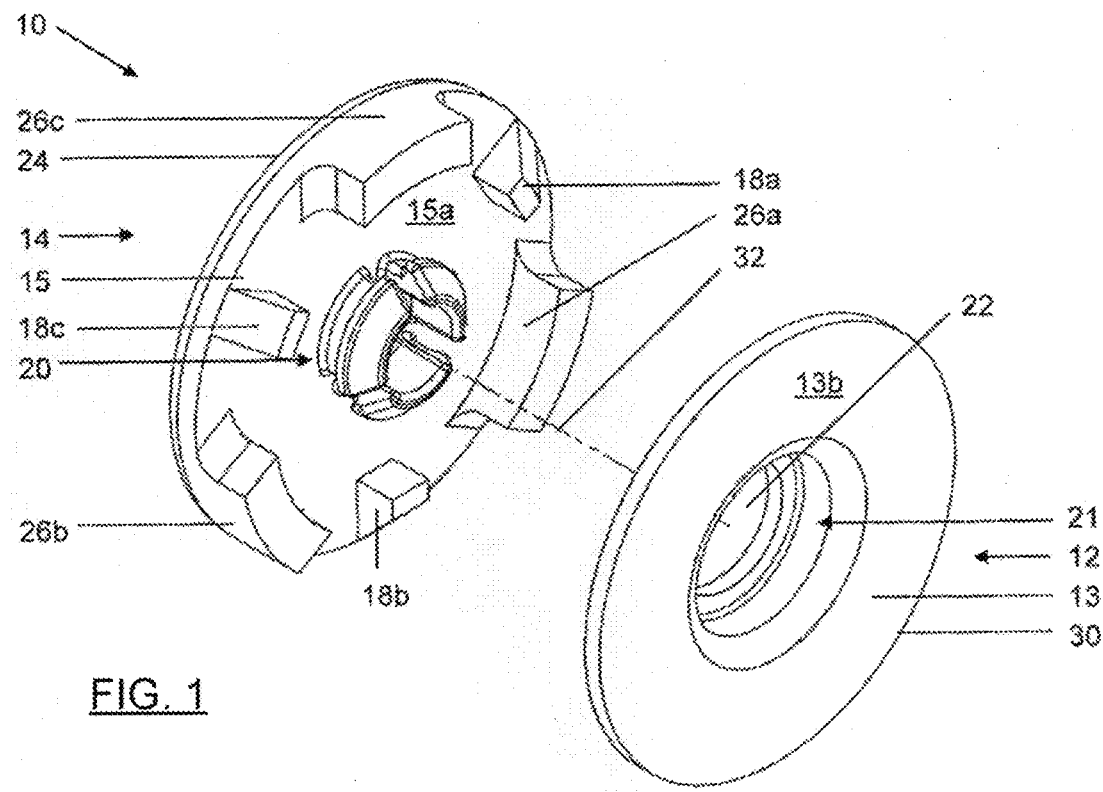
FIG. 1 is an exploded isometric view of a clamp according to a first embodiment.

With reference to FIGS. 1, 2 and 4 to 6C there is depicted a first embodiment of a clamp 10 for connecting three wire mesh panels. The clamp 10 has a cap 12, and a base 14. The cap 12 and the base 14 are releasably attachable to one another by means of a snap fit mechanism 20.

The base 14 is a substantially disc-shaped body 15, having an inner surface 15a, an outer surface 15b and a circular outer edge 24. The base 14 has a mid-point.

The cap 12 is a substantially disc-shaped body 13, having an inner surface 13a, an outer surface 13b and a circular outer edge 30. The cap 12 has a mid-point.

When the clamp 10 is assembled via the snap fit mechanism 20, the base 14 and the cap 12 are arranged such that the base midpoint and the cap midpoint are aligned along longitudinal axis 32. Furthermore, the base outer edge 24 and the cap outer edge 30 are also aligned.

The base has three arms 18a, 18b, 18c, and three spacers 26a, 26b and 26c extending from the inner surface 15a.

The three arms 18a, 18b, 18c on the base 14 are located at the outer edge 24 of the base disc 15. Each arm 18a, 18b, 18c is located an equal distance away from the base disc midpoint 32. Each arm 18a, 18b, 18c is equally spaced away from the other respective arms 18a, 18b, 18c so that the base 14 has rotational symmetry of 120°. When the clamp is assembled, the three arms 18a, 18b, 18c extend from the base disc 15 towards the cap disc 13.

The three arms 18a, 18b, 18c are substantially identical, such that only the structure of first arm 18a shall be described in detail. First arm 18a is substantially wedge shaped, with a rectangular footing extending away from the base disc 15, and terminating in a smaller rectangular apex, parallel to the rectangular footing. A slanted face extends from the base disc outer edge 24, connecting the rectangular footing to the rectangular apex.

The three spacers 26a, 26b and 26c on the base 14 are located at the outer edge 24 of the base disc 15. Each spacer 26a, 26b and 26c is located an equal distance away from the base disc midpoint 32. Each spacer 26a, 26b and 26c is equally spaced away from the other respective spacers 26a, 26b and 26c so that the base 14 has rotational symmetry of 120°. Upon alignment or attachment of the base 14 and the cap 12, the three spacers 26a, 26b and 26c extend from the base disc 15, parallel to the midpoint axis 32, towards the cap disc 13.

The three spacers 26a, 26b, 26c are substantially identical, such that only the structure of the first spacer 26a shall be described in detail. The first spacer 26a is substantially cuboid. The first spacer 26a has an outer face, an inner face, a top face and two side faces. The outer face is curved and aligned with the base outer edge 24. The inner face is curved and parallel to the outer face. Each side face has a radiused corner connecting with the base 14 inner surface 15a.

The arms 18a, 18b, 18c and spacers 26a, 26b, 26c are arranged in an alternating sequence along the outer edge 24 of the base disc 15. Each spacer 26a, 26b, 26c extends further axially from the base disc 15 than the arms 18a, 18b, 18c. There is a clearance between each spacer 26a, 26b, 26c and each adjacent arm 18a, 18b, 18c in which a loop of a panel can be received. There is clearance between each arm 18a, 18b, 18c and the protrusion 16 in which a loop of a panel can be received.

Figure 2:
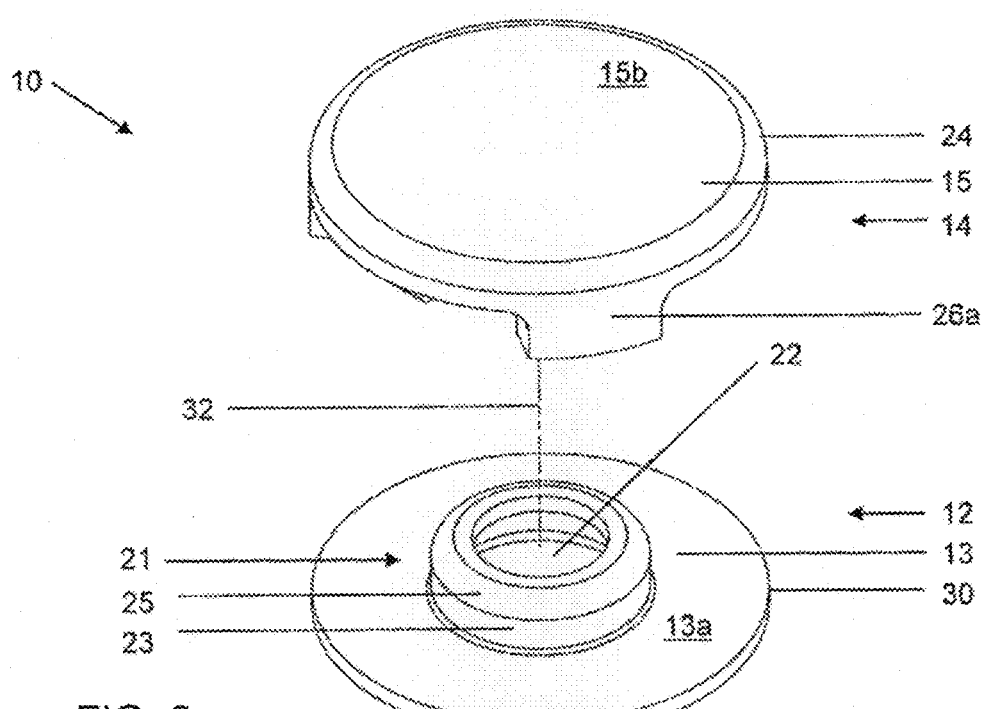
FIG. 2 is an alternate exploded isometric view of the clamp of FIG. 1.
Figure 3:
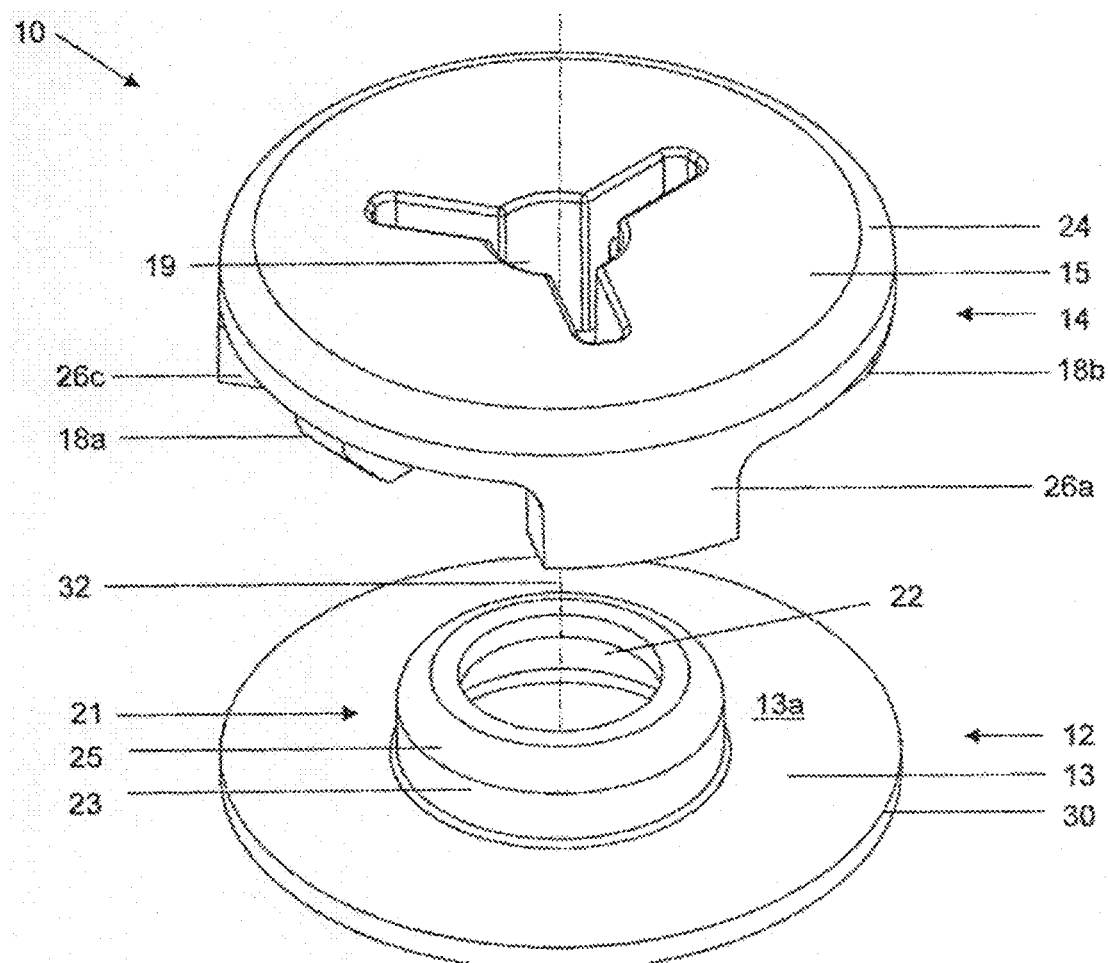
FIG. 3 is an exploded isometric view of the clamp according to a second embodiment.

In a second embodiment, as shown in FIG. 3, the base is provided with an opening 19. The clamp 10 shown in FIG. 2B is the same as the clamp 10 shown in FIG. 2, with the exception that the cap 14 of the clamp 10 shown in FIG. 2B has the opening 19. The opening 19 comprises a circular cavity, and three slots extending radially from the circular cavity. The opening 19 aids alignment of the wire mesh panels, by giving a visual indication of where the wire mesh panels should be aligned. The three slots extend radially towards three respective midpoints defined by the three arms 18a, 18b, 18c. The three slots extend respectively towards the three spacers 26a, 26b, 26c, that is respective circumferential mid-points between the adjacent arms 18a, 18b, 18c.

The opening 19 extends through the snap fit mechanism 20, such that the snap fit mechanism 20 defines three axial slots. The three axial slots aid visual alignment of the wire mesh panels with the base 14 during attachment. Furthermore, a greater flexibility in the snap fit mechanism 20 is provided by the slot, resulting in a snap fit mechanism that resiles with a lower axial force.

The base 14 (of both FIGS. 2 and 3) is a single moulded piece comprising the arms 18a, 18b, 18c, the spacers 26a, 26b, 26c and the protrusion 16.

The snap fit mechanism 20 is a resilient protrusion 16 on the base 14 and an annular lip 21 on the cap 12. The protrusion 16 consists of three sections; 16a, 16b, 16c. The three sections 16a, 16b, 16c extend axially from the inner surface 15a of the base 14, and are arranged in a circle. Each section 16a, 16b, 16c has a stem and a head. Each head is tapered. Each head extends radially away from the longitudinal axis 32, such that the heads overhang the respective stems.

The annular lip 21 is defined by a cylindrical wall 23 extending from the inner surface 13a of the cap 12. An annular rim 25 extends radially from the aperture wall 23 towards the longitudinal axis 32, so that a plane defined by the annular rim 25 and a plane defined by the cap disc 13 are substantially parallel. The annular rim 25 defines a circular aperture 22.

Upon attachment of the base 14 and the cap 12, the base 14 and the cap 12 are pushed together along longitudinal axis 32. Upon contact of the aperture rim 25 and the protrusion sections 16a, 16b, 16c, and as the base 14 and cap 12 continue to be pushed together, the protrusion sections 16a, 16b, 16c resile towards longitudinal axis 32 until the rim 25 of the aperture moves over the overhanging lip of the heads of the section.

At this point, the sections snap back to their resting position as described above and are in an assembled position (see FIG. 4). Upon attachment of the base 14 and the cap 12, the rim 25 of the aperture 22 is fitted around the stems of the sections 16a, 16b, 16c, and the aperture wall 23 is fitted around the heads of the sections 16a, 16b, 16c.

Upon attachment of the base 14 and the cap 12, the spacers 26a, 26b, 26c completely bridge the base 14 and the cap 12. Upon attachment of the base 14 and the cap 12, the arms do not completely bridge the base 14 and the cap 12. The spacers 26a, 26b, 26c prevent rocking of the cap relative to the base when the clamp is assembled.

The first and second embodiments are configured to capable of connecting three panels 40a, 40b, 40c with three respective loops 41a, 41b, 41c in two different ways.

Figure 5:
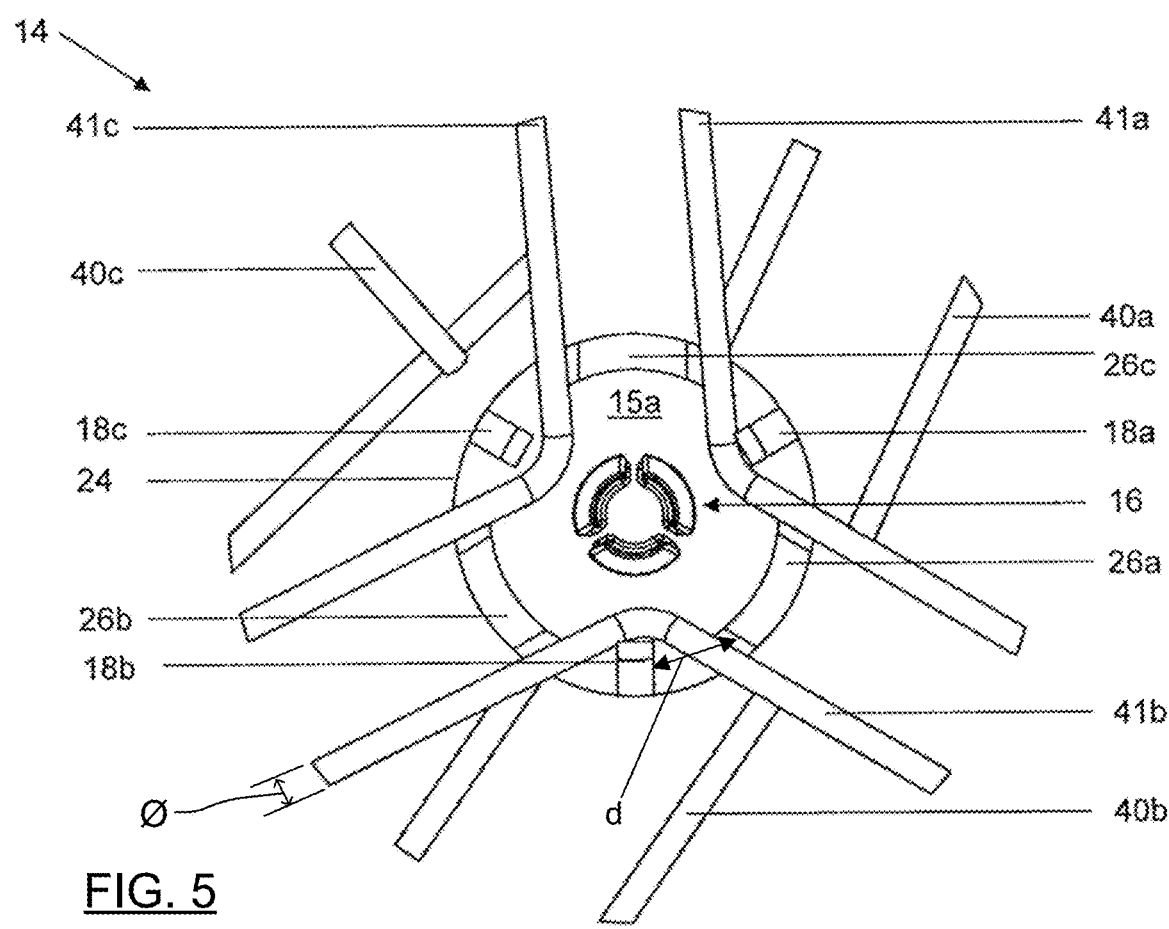
FIG. 5 is a rear view of the base of the clamp of FIG. 1, arranged with three wire mesh panels.

In a first way of connecting the panels, the base 14 and the three loops 41a, 41b, 41c of three respective panels 40a, 40b, 40c are assembled (see FIG. 5). The three loops 41a, 41b, 41c are placed between the central protrusion 16 of the base 14 and each respective arm 18a, 18b, 18c. The cap 12 is then aligned with the base 14 and pushed onto the base 14, until the snap-fit mechanism is pushed into an assembled position. In the assembled position the rim 25 of the aperture 22 is fitted around the stems of the sections 16a, 16b, 16c, and the aperture wall 23 is fitted around the heads of the sections 16a, 16b, 16c.

Figure 4:
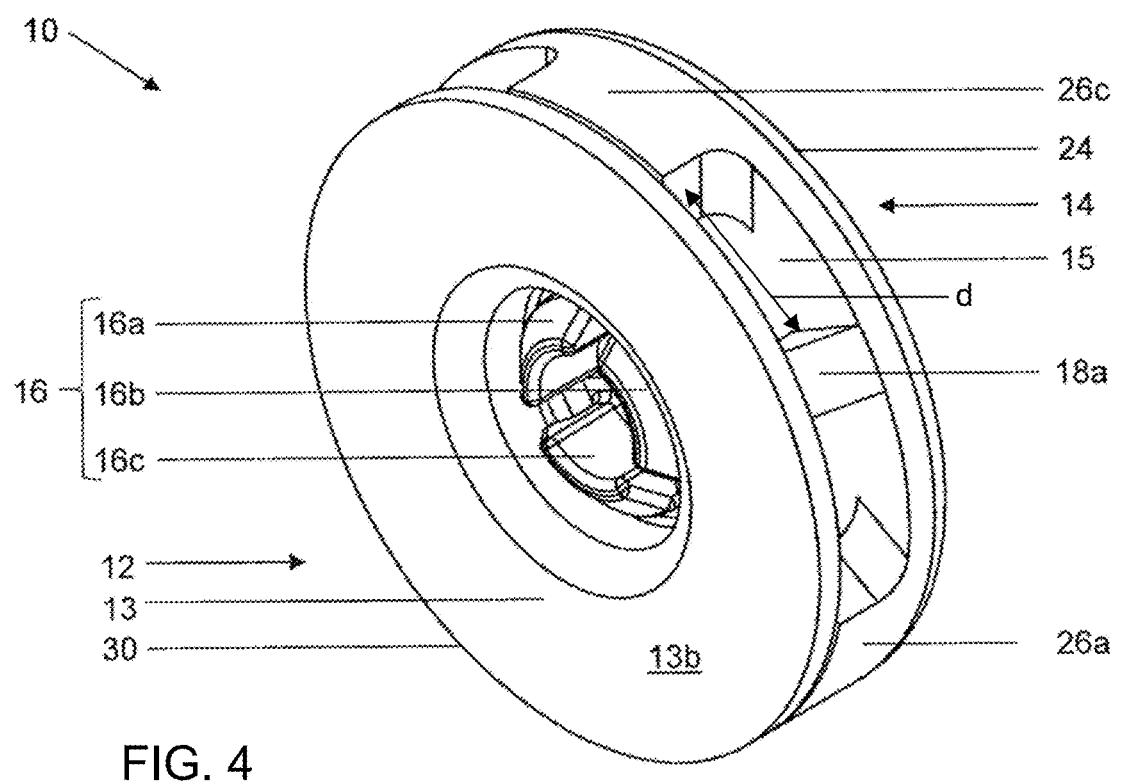
FIG. 4 is an isometric view of the clamp of FIG. 1 assembled.

In the second method, (see FIGS. 6A to 6C) the base 14 and the cap 12 are pushed together into the assembled position as per FIG. 4. A loop 41a of a first panel 40a is then pushed between the base 14 and the cap 12, radially towards the longitudinal axis 32 until it is between the protrusion 16 and one of the arms 18a, 18b, 18c. The slanted face of the wedge-shaped arm 18a assists with locating the loop 41a of the first panel 40a. A loop 41b of a second panel 40b is then pushed between the base 14 and the cap 12, radially towards the longitudinal axis 32 until it is between the protrusion 16 and one of the other arms 18a, 18b, 18c. A loop 41c of a third panel 40c is then pushed between the base 14 and the cap 12, radially towards the longitudinal axis 32 until it is between the protrusion 16 and the remaining arm 18a, 18b, 18c.

Permutations of the above two methods are possible. For example, the first method may be used to secure a first panel, and the second method may be used to secure the second and third panel.

In the assembled position, the arms 18a, 18b, 18c are arranged to secure each loop of a panel so that each panel cannot be easily removed from the clamp 10. Upon assembly of the clamp 10 and the panels 40a, 40b, 40c, the panels are able to pivot. This enables the panels 40a, 40b, 40c to be connected either substantially in the same plane, or substantially out of the same plane.

As will be apparent to persons skilled in the art, the arms each co-operate with immediately adjacent spacers, to either side of each arm, to define a channel for the receipt of a loop of a wire mesh panel. For example, as shown in FIG. 4, arm 18a co-operates with adjacent spacers 26a and 26c to define a channel that is open at both ends, namely at a first end consisting of a space between spacer 26a and arm 18a and a second end consisting of a space between spacer 26c and arm 18a. Each channel, as described above, is configured to accommodate a loop of a wire mesh panel.

In the embodiments aforementioned, and indeed in the embodiments mentioned hereafter, the clamp is configured for coupling three panels together. In other envisaged arrangements, the clamp may be configured for coupling less than three or more than three panels together.

A third embodiment provides a clamp 110 as depicted in FIGS. 7 to 14. Similar reference numerals have been used for features similar to those described in relation to clamp 10, pre-fixed with a "1" to indicate those features as being in relation to clamp 110.

The clamp 110 has a base 114, a cap 112 and a threaded connection arrangement 120.

The base 114 is a substantially disc shaped body 115, having an inner surface 115a, an outer surface 115b and a circular outer edge 124. The base 114 has a mid-point.

The cap 112 is a substantially disc shaped body 113, having an inner surface (113a), an outer surface 113b and has a circular outer edge 130. An annular rim 131 extends from the inner surface at the circular outer edge 130. The cap 112 has a mid-point.

Figure 6A:
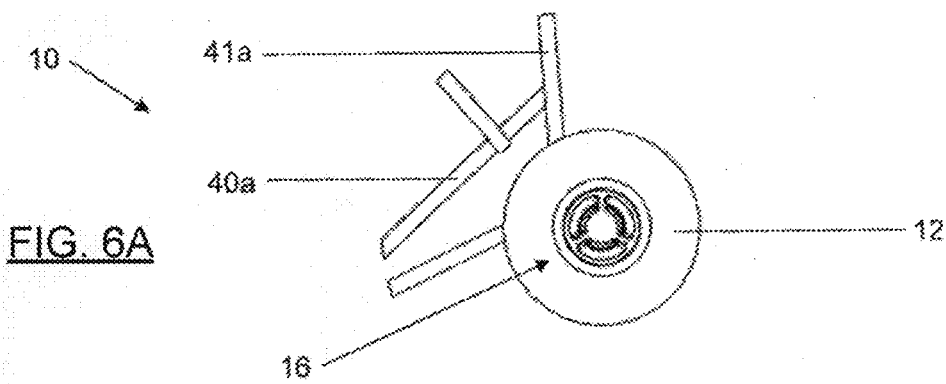
FIGS. 6A to 6C are rear views of the clamp of FIG. 1 attached to one panel, two panels and three panels respectively.
Figure 6B:
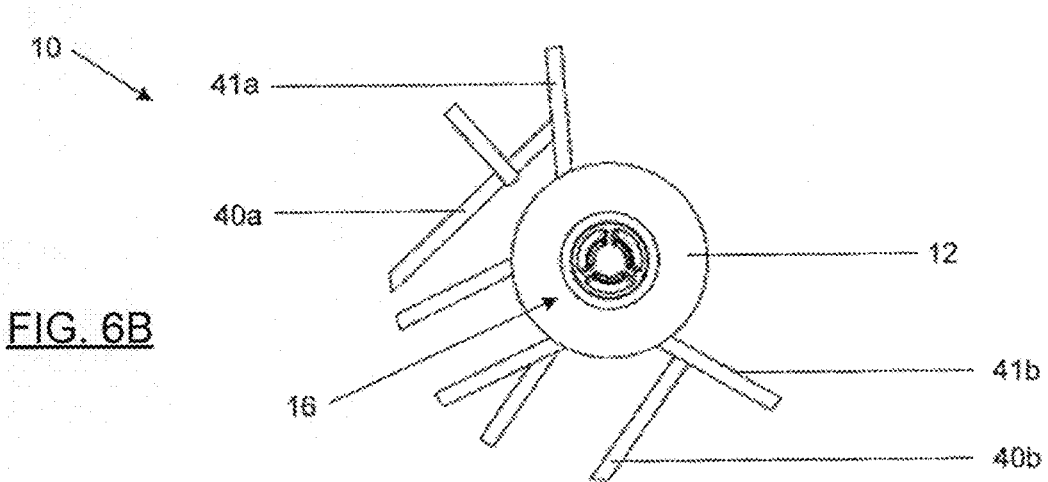
Figure 6C:
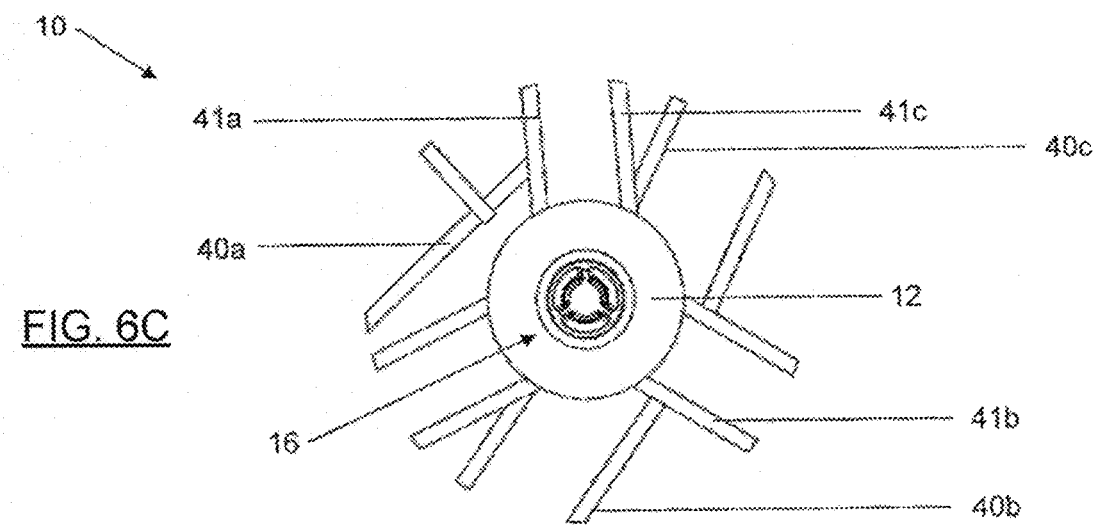
Figure 7:
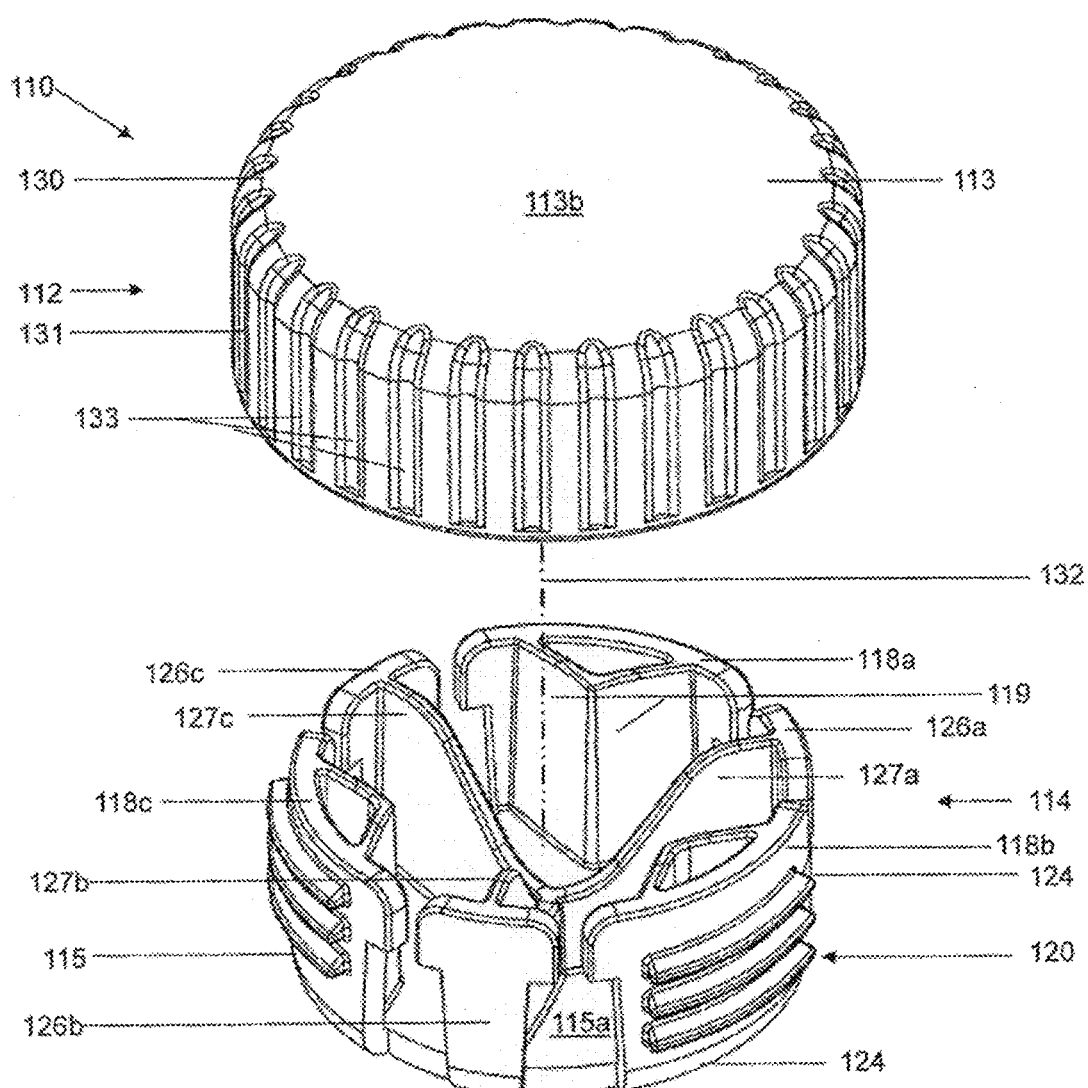
FIG. 7 is an exploded isometric view of the clamp according to a third embodiment.

The cap 112 has an inner wall 170, as shown in FIG. 6B. The inner wall 170 is circular. The inner wall 170 is aligned so as to be concentric with the rim of the cap. The inner wall 170 is located so as to allow receipt of the arms and/or spacers of the base 114 between the inner wall 170 and the rim 131 of the cap 112.

The base 114 and the cap 112 are releasably attachable by means of the threaded connection arrangement 120.

Upon attachment of the base 114 and the cap 112 via the threaded connection arrangement 120, the base 114 and the cap 112 are arranged such that the base midpoint and the cap midpoint are aligned along longitudinal axis 132.

The base 114 has three arms 118a, 118b, 118c, three spacers 126a, 126b, 126c and three central walls 127a, 127b, 127c, all extending orthogonally from the inner surface 115a. As with the earlier embodiments, each arm co-operates with adjacent spacers to define a channel for the receipt of a loop of a wire mesh panel.

The three arms 118a, 118b, 118c of the base 114 are located at the outer edge 124 of the base disc 115. Each arm 118a, 118b, 118c is located an equal distance away from the base disc midpoint. Each arm 118a, 118b, 118c is equally spaced away from the other respective arms 118a, 118b, 118c so that the base 114 has rotational symmetry of 120°. Upon alignment or attachment of the base 114 and the cap 112, the three arms 118a, 118b, 118c extend from the base disc 115, parallel to the longitudinal axis 132 towards the cap 112.

Figure 8:
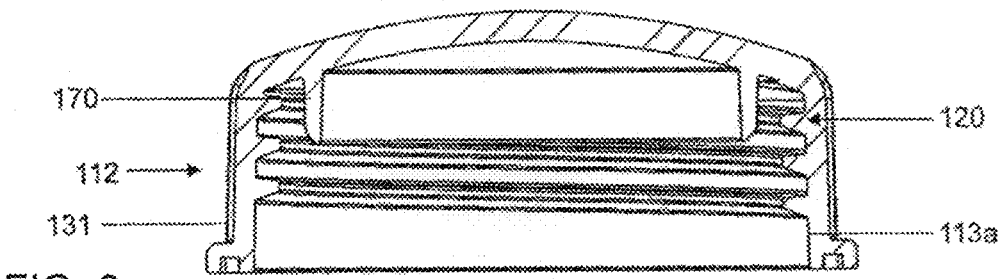
FIG. 8 is a cross-section through the cap of the clamp of FIG. 7.

The three arms 118a, 118b, 118c are substantially identical, such that only the structure of the first arm 118a shall be described in detail. With reference to FIGS. 6A and 8, the first arm 118a has three walls; an outer wall and two supporting walls 119. The outer wall is curved and extends part of the way along the outer edge 124 of the base disc 115. The outer wall has three ridges extending away from the longitudinal axis 132. The three ridges are substantially parallel and define a thread of the threaded connection arrangement 120. The outer wall also has two circumferentially extending tabs 141, 142. The circumferentially extending tabs 141, 142 extend from an upper region of the outer wall. Each circumferentially extending tab has a radiused outer edge 143. The two supporting walls join at a point between the outer wall and the longitudinal axis 132. The supporting walls together define a V-shape when the base 114 is viewed from above.

The three spacers 126a, 126b, 126c of the base 114 are located at the outer edge 124 of the base disc 115. Each spacer 126a, 126b, 126c is located an equal distance away from the base midpoint 132. Each spacer 126a, 126b, 126c is equally spaced away from the other respective spacers 126a, 126b, 126c so that the base 114 has rotational symmetry of 120°. Upon alignment or attachment of the base 114 and the cap 112, the three spacers 126a, 126b, 126c extend from the base disc 115, parallel to the midpoint axis 132, towards the cap 112.

Figure 9:
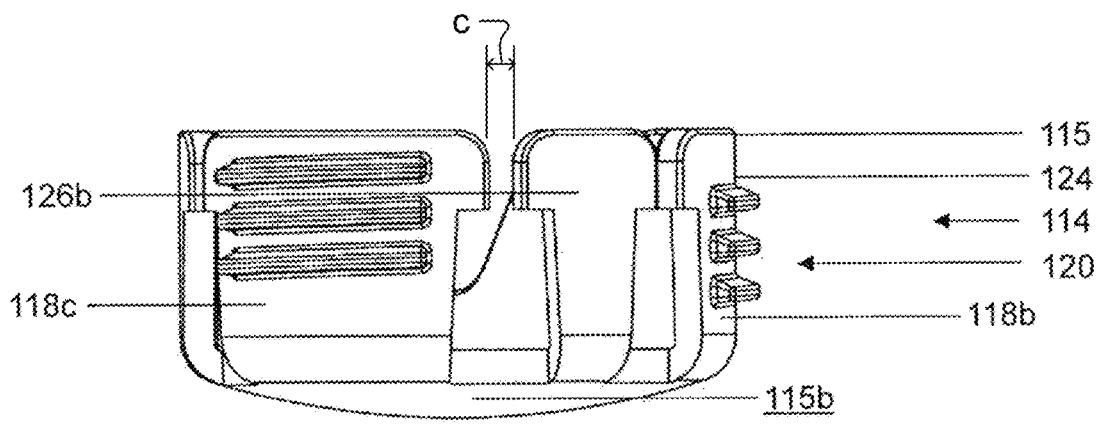
FIG. 9 is a side elevation of the base of the clamp of FIG. 7.
Figure 10:
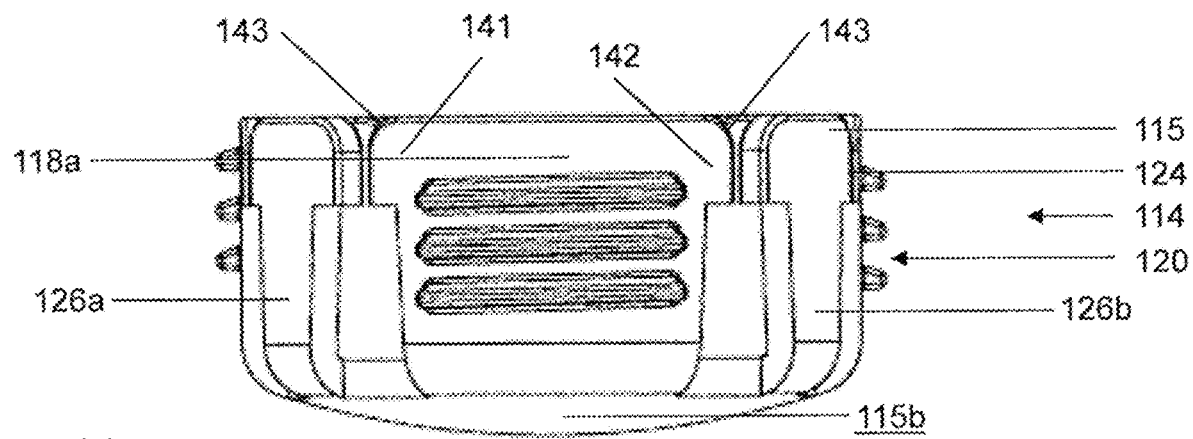
FIG. 10 is an alternate side elevation of the base of the clamp of FIG. 7.
Figure 11:
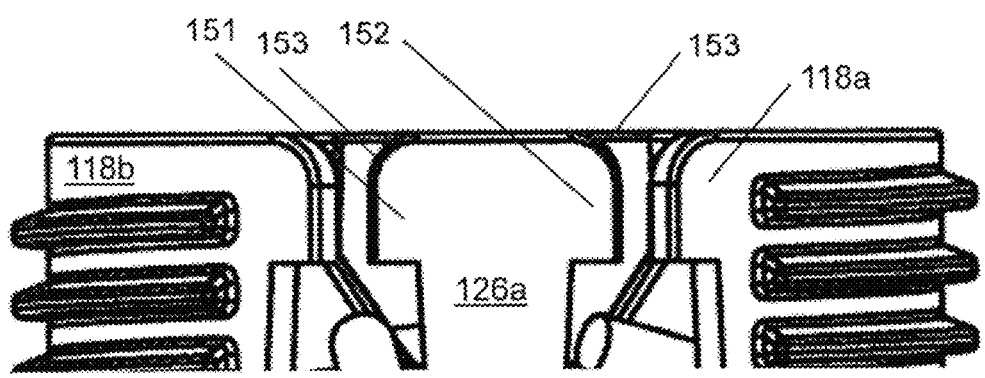
FIG. 11 is an enlarged alternate side elevation of the base of the clamp of FIG. 7.
Figure 12:
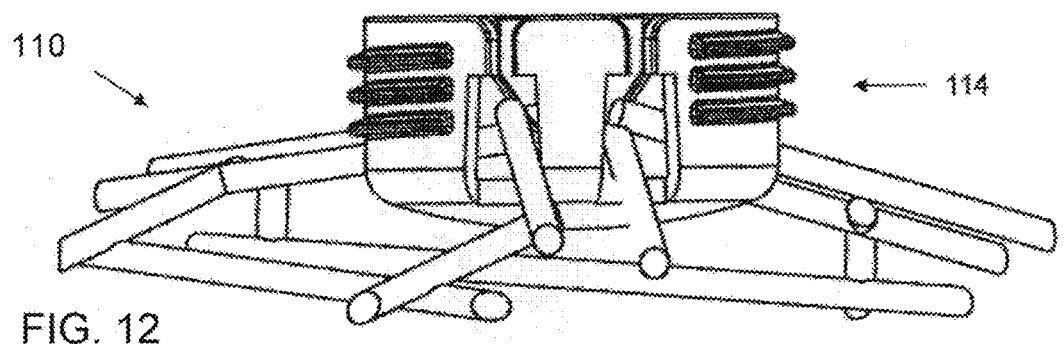
FIG. 12 is a side elevation of the base of the clamp of FIG. 7 assembled on three wire-mesh panels.
Figure 13:
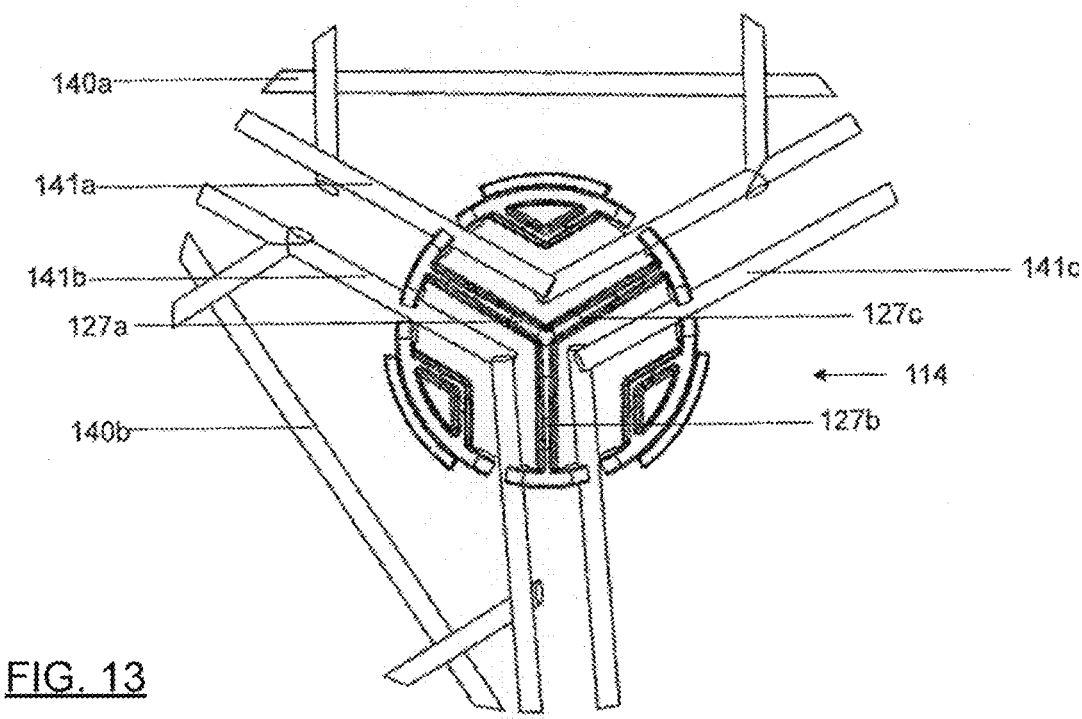
FIG. 13 is a rear view of the arrangement depicted in FIG. 12.
Figure 14:
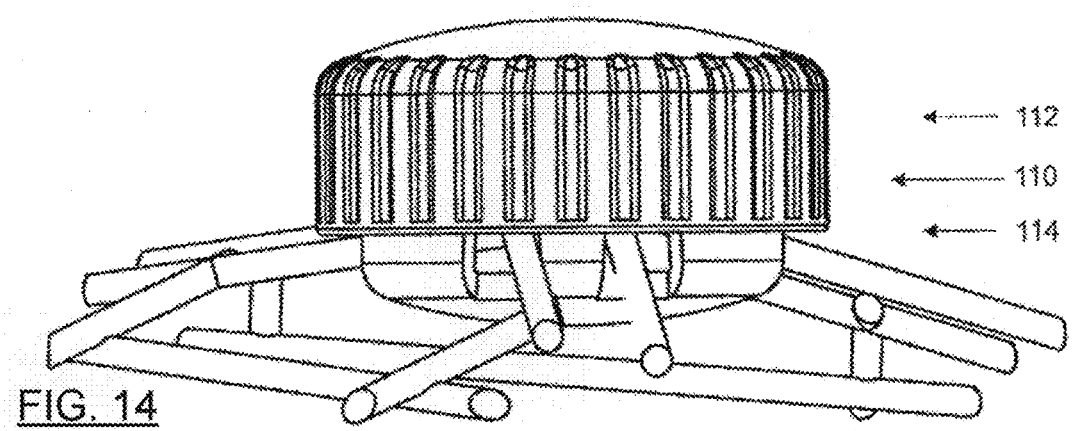
FIG. 14 is a side elevation of the clamp of FIG. 7 assembled on three wire-mesh panels.

The three spacers 126a, 126b, 126c are substantially identical such that only the structure of the first spacer 126a shall be described in detail. With reference to FIGS. 6A and 9, the first spacer 126a has two circumferentially extending tabs 151, 152. The circumferentially extending tabs 151, 152 extend from an upper region of the spacer 126a. Each circumferentially extending tab 151, 152 has a radiused outer edge 153.

The three central walls 127a, 127b, 127c extend from the three spacers 126a, 126b, 126c, towards the longitudinal axis 132. The three central walls 127a, 127b, 127c join at the longitudinal axis 132. Each central wall 127a, 127b, 127c has a height h. The height h is a function of the distance from the respective spacer 126a, 126b, 126c towards the longitudinal axis 132. The height h decreases from a maximum at the respective spacer 126a, 126b, 126c to a minimum at the central axis. Each central wall 127a, 127b, 127c is the same shape.

Each central wall 127a, 127b 127c is oriented with respect to the other central walls 127a, 127b, 127c so that the base 114 has rotational symmetry of 120°.

The three central walls 127a, 127b, 127c, act to reinforce the spacers 126a, 126b, 126c.

Each spacer 126a, 126b, 126c is arranged between two of the three arms 118a, 118b, 118c along the outer edge 24 of the base disc 115. Each spacer 126a, 126b, 126c extends the same distance axially from the base disc 109 as the arms 118a, 118b, 118c. There is a clearance between each spacer 126a, 126b, 126c and each adjacent arm 118a, 118b, 118c in which a loop of a panel can be received. The clearance is restricted where the circumferentially extending tabs 143, 153 of the arms and spacers are adjacent in the form of a constriction. The base comprises a total of three constrictions. There is a clearance between each arm 118a, 118b, 118c its two adjacent central walls 127a, 127b, 127c in which a loop of a panel can be received.

The base 114 is a single moulded piece comprising the arms 118a, 118b, 118c, the spacers 126a, 126b, 126c and the central walls 127a, 127b, 127c.

Upon alignment of the base 114 and the cap 112, the annular rim 131 extends between the base 114 and the cap 112. The rim 131 has an inner surface and an outer surface.

The inner surface has a spiral groove into which the threaded ridges of the arms 118a, 118b, 118c of the base 114 are adapted to fit. The outer surface of the rim 124 has a series of axial grooves 131. The axial grooves 131 allow cap 112 to be more easily rotated and screwed onto the base 114.

Upon attachment of the base 114 and the cap 112, the spacers 126a, 126b, 126c completely bridge the base 114 and the cap 112. Upon attachment of the base 114 and the cap 112, the arms completely bridge the base disc 115 and the cap disc 113.

This embodiment of the present invention is configured to connect three panels 140a, 140b, 140c with three respective loops 141a, 141b, 141c—although as mentioned previously, it is envisaged to provide a clamp that can connect less than or more than three panels together.

In order to assemble the base 114 and the three loops 141a, 141b, 141c of three respective panels 140a, 140b, 140c, each loop 141a, 141b, 141c of each panel 140a, 140b, 140c is pushed axially into a channel defined by one of the three arms 118a, 118b, 118c, two of the three spacers 126a, 126b, 126c and two of three central walls 127a, 127b, 127c. The constrictions prevent the loops 141a, 141b, 141c from being removed without force. In this position, the panels 140a, 140b, 140c are able to pivot but cannot be separated without force.

The cap 112 is then aligned with the base 114 and screwed onto the base 114, until the cap provide sufficient clamping forced to secure the panels 140a, 140b, 140c. In this position, the panels 140a, 140b, 140c are secured into position and have limited movement, but may be arranged in different orientations.

In the assembled position, the arms 118a, 118b, 118c are arranged to secure each loop of a panel so that each panel cannot be removed from the clamp 110 without un-screwing the cap 112 from the base 114.

Figure 15:
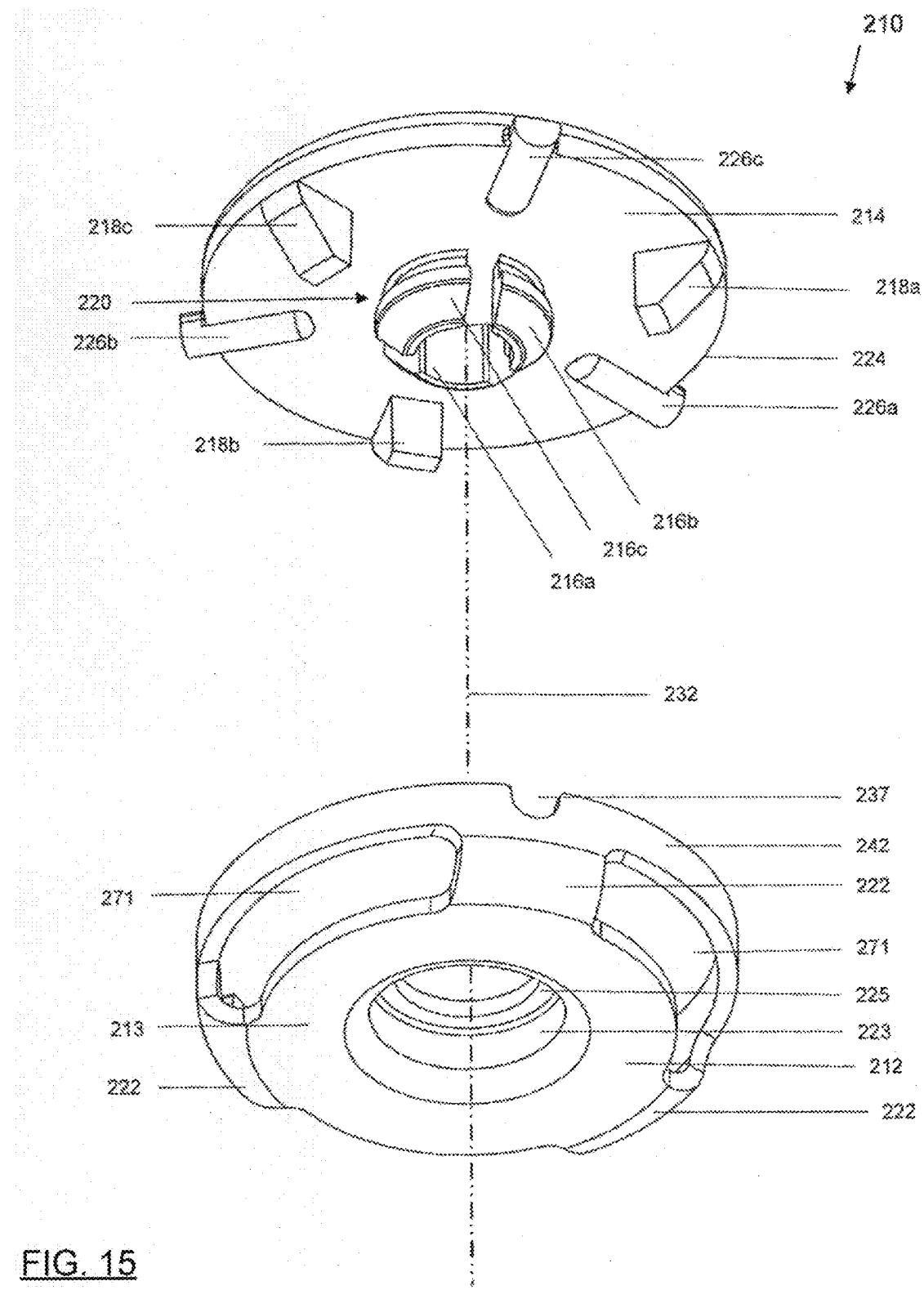
FIG. 15 is an exploded isometric view of the clamp according to a fourth embodiment.

In a fourth arrangement there is provided a clamp 210, the base 214 and cap 212 of which are depicted respectively in FIG. 15. Similar reference numerals have been used for features similar to those described in relation to clamp 10, pre-fixed with a "2" to indicate those features as being in relation to clamp 210. Only the principle differences shall be described in detail.

The clamp 210 has a base 214, a cap 212 and a snap fit mechanism 220.

The base 214 has three spacers 226a, 226b, 226c. The three spacers 226a, 226b, 226c extend past the outer edge 224 of the base 214.

The cap 212 defines a cap disc 213, three cap arms 222 and a ring 242. The three cap arms 222 bridge the cap disc 213 and the ring 242, defining three arced cavities. The three arced cavities are adapted to each receive a portion of a loop of a panel.

The ring 242 of the cap 212 has three indentations 237. The three indentations 237 are adapted to receive an outer portion of the three spacers 226a, 226b, 226c of the base 214. In use, the three indentations 237 are aligned with the three arms 222 of the cap 212, and interlock as the cap 212 and base 214 are brought together.

The ring 242 of the cap 212, the cap disc 213 and the cap arms 242 together define three openings 271. The three openings 271 are each adapted to receive a portion of a loop of a panel into a channel defined by an arm and two adjacent spacers. Three channels in total are provided in the particular arrangement depicted in FIG. 15, but it will be appreciated that a greater or lesser number of channels could readily be provided if desired.

FIGS. 16 to 25 depict a fifth arrangement of a clamp 310. Similar reference numerals have been used for features similar to those described in relation to clamp 10, pre-fixed with a "3" to indicate those features as being in relation to clamp 310. Only the principle differences shall be described in detail.

One principle difference between the clamp 310 of this embodiment and clamps of earlier embodiments is that in this arrangement the base 314 is a two-pail assembly comprising a minor base portion 314a, a major base portion 314b and a resilient bias 350, for example a helical spring, provided therebetween so that the major portion 314b can move axially relative to the minor portion 314a when the clamp is in a partly released configuration as depicted in FIGS. 18 and 19.

Figure 20:
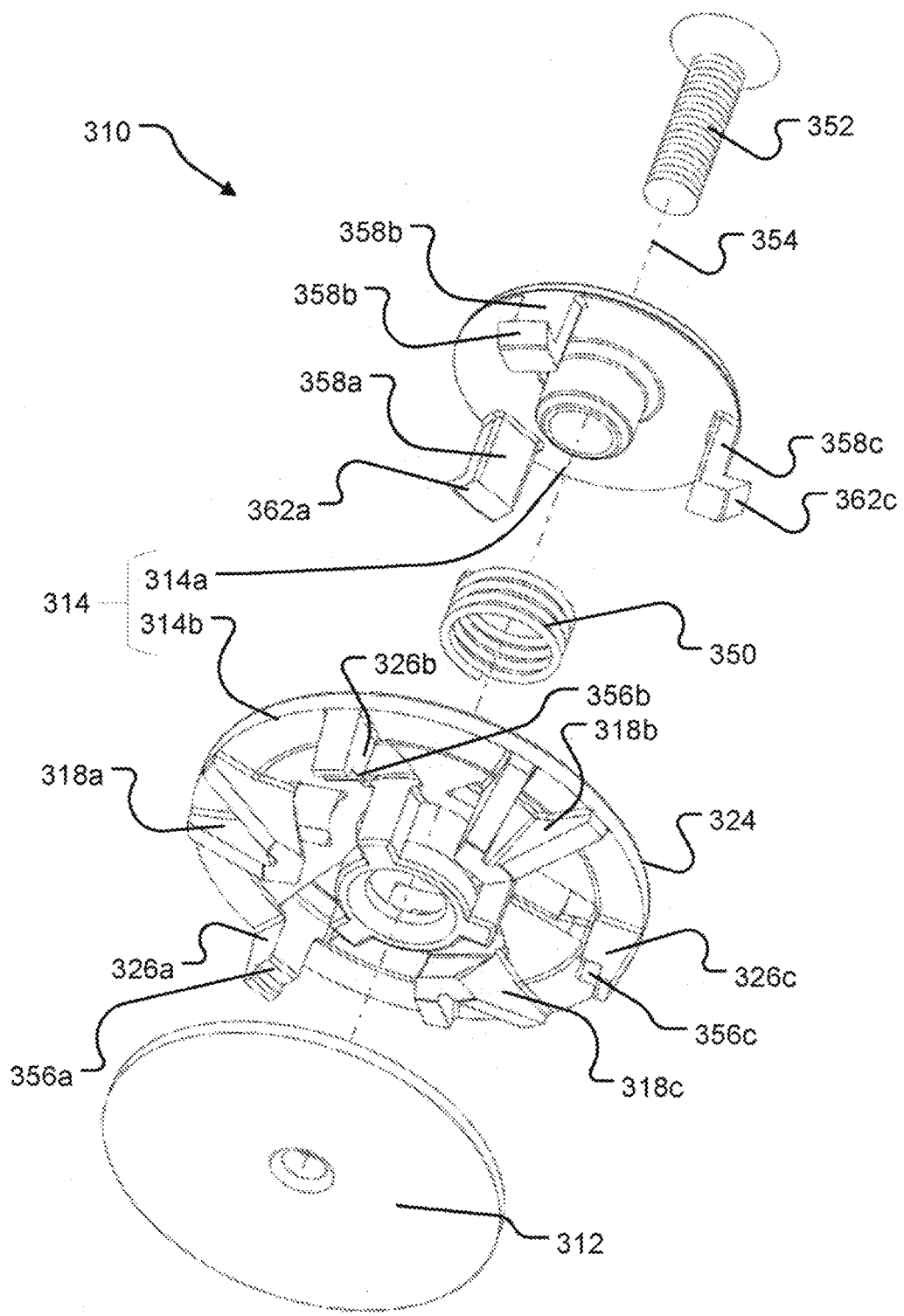
FIG. 20 is an exploded isometric view of the clamp shown in FIGS. 16 to 19.

As best shown in FIG. 20, a releasable fixing 352 (in this particular example, a screw) extends through the minor base portion 314a, the major base portion 314b and engages with the cap 312 to couple the base 314 to the cap 312 with the resilient bias captured between the minor base portion 314a and the major base portion 314b.

When the fixing is tightened, as depicted in FIGS. 16 and 17, the minor base portion 314a is held by the fixing 352 against the major base portion 314b, the resilient bias 350 is compressed, and the major base portion 314b is held against the cap 312. When the fixing is loosened as depicted in FIGS. 18 and 19, the minor base portion 314a is driven by the resilient bias 350 away from the cap 312 so that the major base portion 314b can move axially (along axial line 354, FIG. 20) away from the cap 312 to compress the resilient bias 350.

As with the clamp of earlier embodiments, the base 314 includes (in this particular example) three arms 318a, 318b, and 318c circumferentially equidistant from one another around the periphery 324 of the base 314. The arms in this embodiment are generally V-shaped and ramped towards the cap 312 (i.e. the arms extend from a larger base adjacent the major base portion 314b to a smaller face that is spaced from the major base portion 314b, and have a radially inwardly inclined and radially outwardly facing surface over which a loop of a wire mesh panel can slide).

Spacers 326a, 326b and 326c are coupled to the major base portion 314b and arranged so that each spacer is located circumferentially between two of the aforementioned arms. The spacers 326a, 326b and 326c each include a radially inwardly directed notch 356a, 356b and 356c that function as a seat for the cap 312 when the fixing 352 is tightened to draw the base 314 against the cap 312.

The minor base portion 314a includes three legs 358a, 358b and 358c that pass through associated apertures 360a, 360b and 360c (see FIG. 25) in the major base portion 314b to co-operate, respectively, with the arms 318a, 318b and 318c when the minor base portion 314a is drawn against the major base portion 314b by tightening the fixing 352.

Each of the legs includes a radially outwardly extending tab 362a, 362b and 362c and the tabs co-operate with a ledge (not visible) formed by a radially outward edge of each of the associated apertures 360a, 360b and 360c to loosely couple the minor base portion 314a to the major base portion 314b in the absence of the fixing 352. This reduces the chance of the clamp spontaneously disassembling if a user should inadvertently over-loosen the fixing 352.

Figure 25:
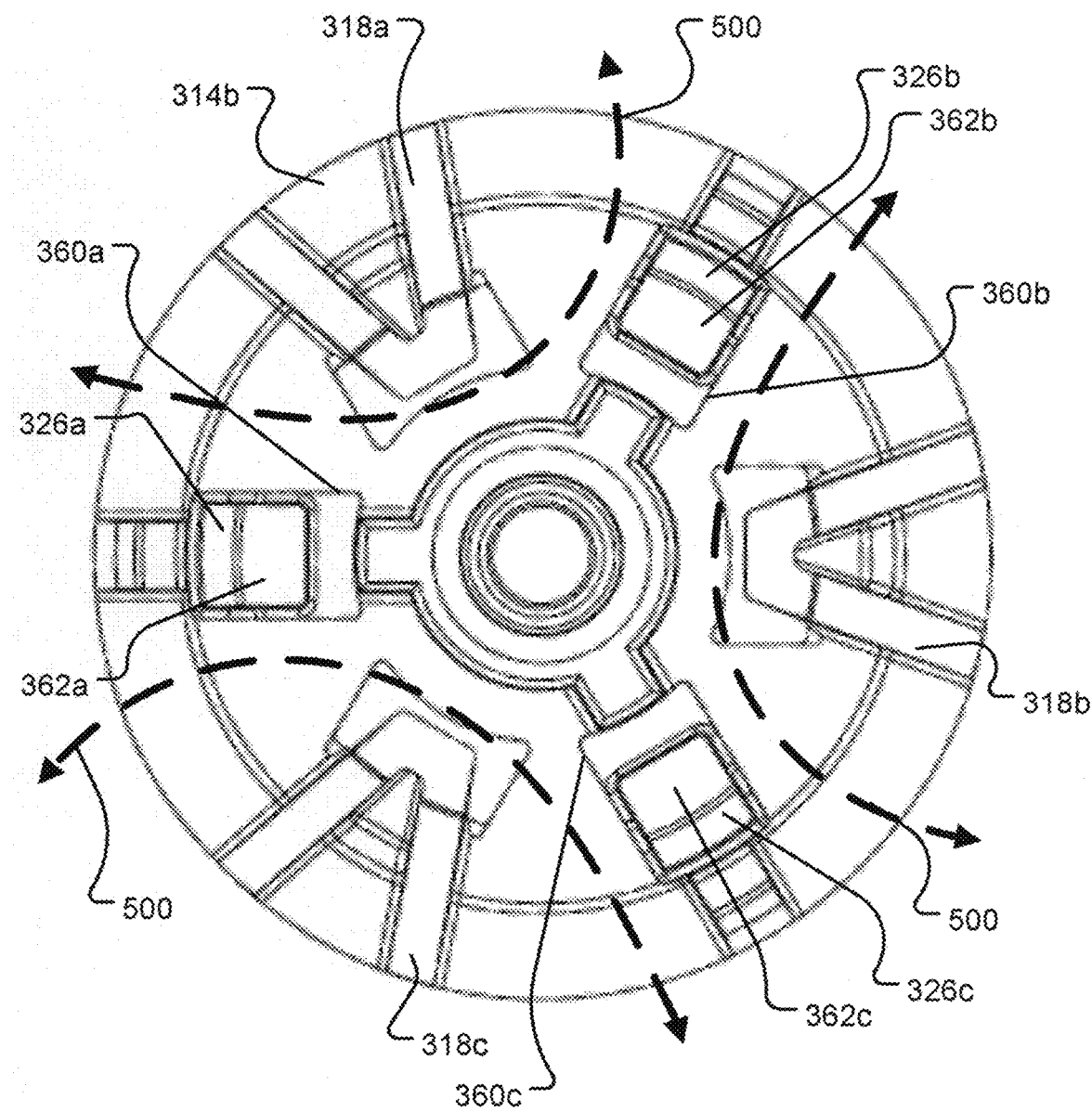
FIG. 25 is a plan view of the underside of the base of the clamp shown in FIGS. 14 to 22.

As with earlier embodiments, the clamp provides a plurality of channels in each of which a loop of a wire mesh panel can be received. In this instance, for a given arm (say, arm 318a), each channel opens at one end between the arm (318a) and a spacer (326a) adjacent one side of the arm, extends inwardly behind the arm, and opens at the other end between the arm and a spacer (326b) adjacent the other side of the arm. As shown in FIG. 25, in this particular embodiment the clamp is configured to provide three channels 500 in each of which a loop of a wire mesh panel may be received.

In an envisaged arrangement, as depicted in FIGS. 21 to 24, a radially inward face of each arm may be radially inclined from the base towards the cap so as to enhance retention of the loops in the channels.

Figures 23, 24:
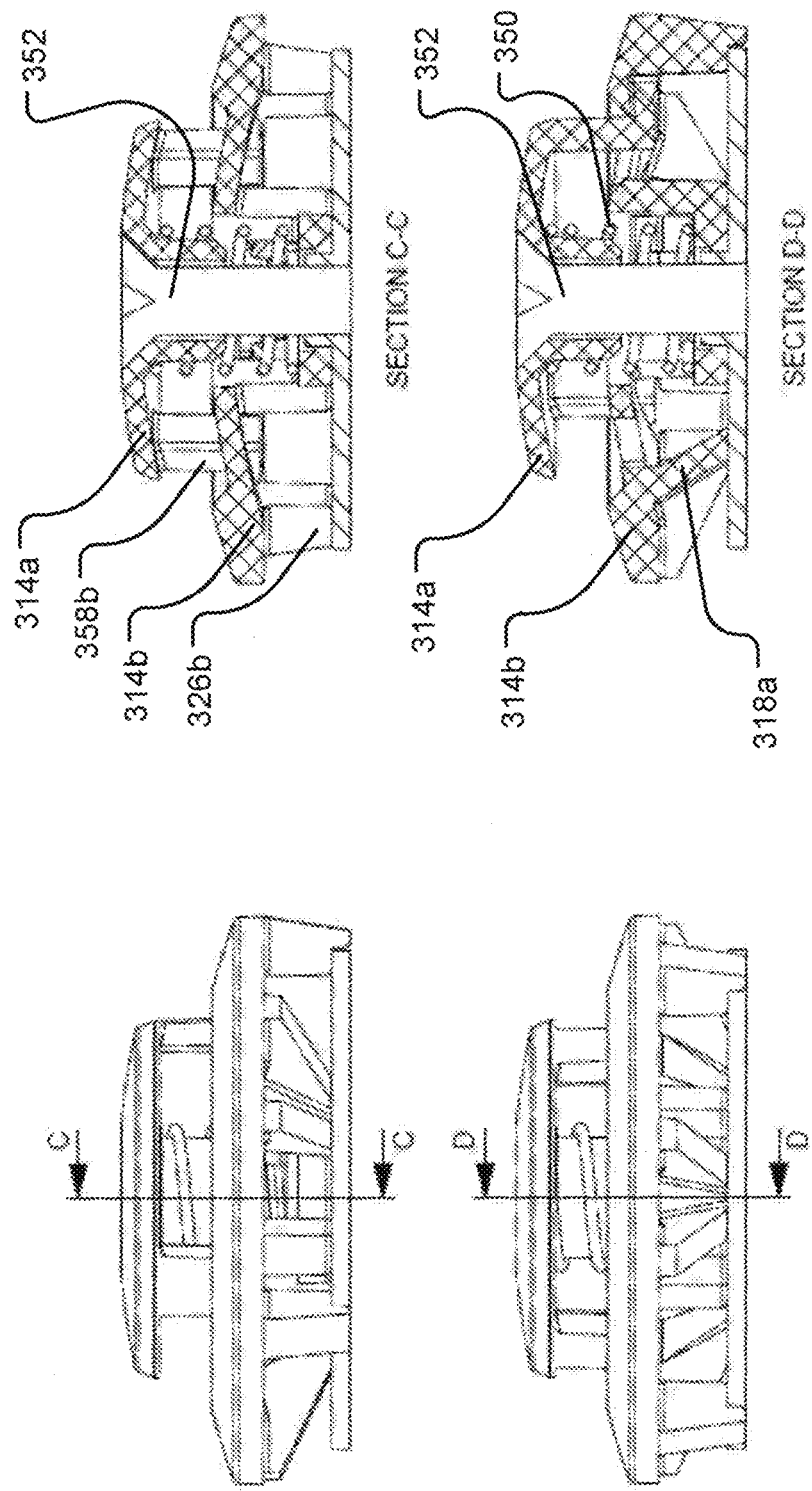
FIGS. 23 and 24 are cross-sectional views of the clamp in a partly released configuration along the lines C-C and D-D respectively.

Referring now to FIGS. 23 and 24, with the fixing 352 loosened, a loop of a wire mesh panel can be pushed against the ramped arm 318a to lift the major base portion 314b towards the minor base portion 314a against the resilient bias 350, until the loop can pass over the arm 318a. In this position, the loop is separated from an adjacent loop of another wire mesh panel by the spacer 326b.

Once a wire mesh panel has been engaged with each of the arms (assuming that one wishes to couple, in this particular example, three panels together), the fixing can be tightened, as shown in FIGS. 21 and 22, to draw the minor base portion 314a against the major base portion 314b to compress the resilient bias 350, and the major base portion 314b against the cap 312. In this position, removal of the respective loops from their channels is resisted.

Figure 26:
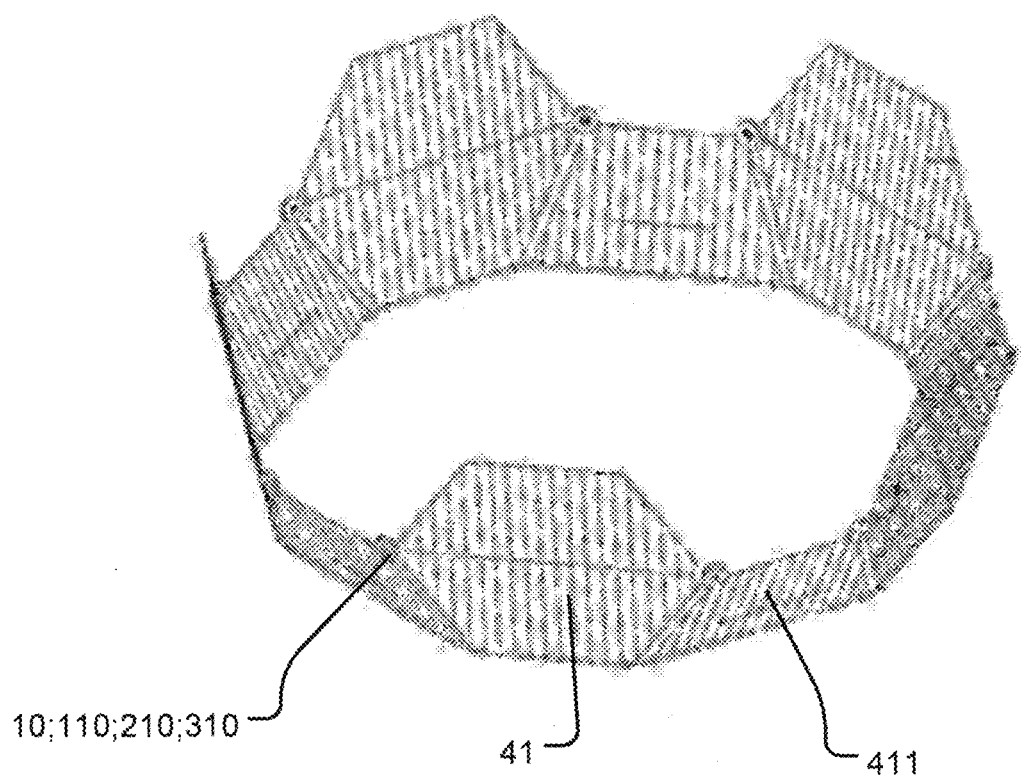
FIG. 26 depicts a panel assembly comprising a plurality of panels that have been attached to one another by a plurality of clamps.
Figure 27:
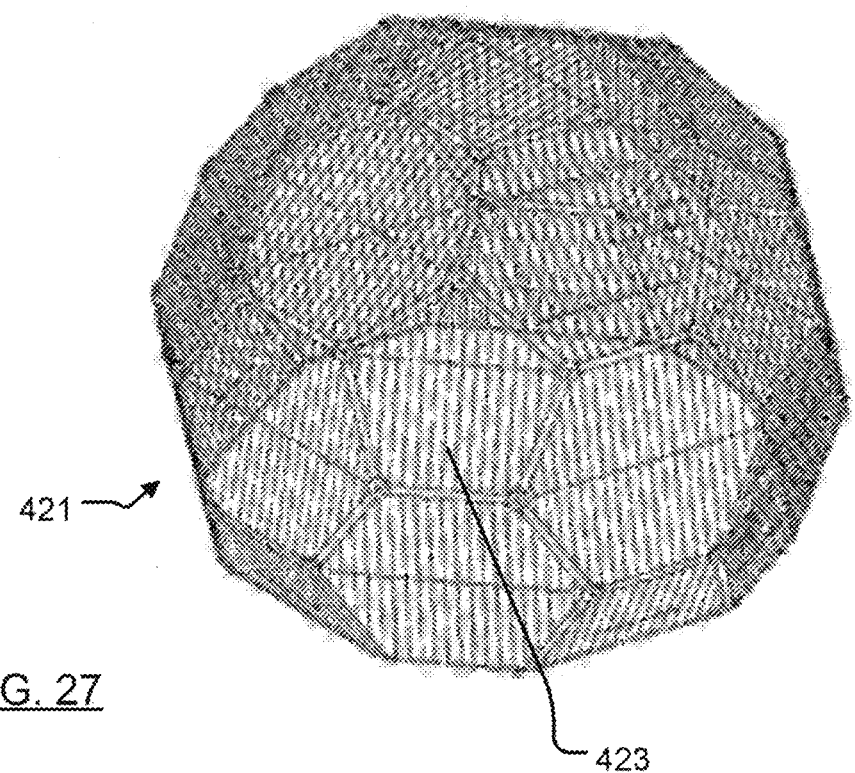
FIG. 27 depicts a geodesic animal cage assembled from a plurality of panels that have been attached to one another by a plurality of clamps.

Referring now to FIGS. 26 and 27, the clamps disclosed herein can be employed to clamp—in this particular example—a hexagonal wire mesh panel 41 to neighbouring trapezium-shaped panels 411. A geodesic dome 421 as disclosed in our UK Patent No. 2563317 can then be constructed by coupling pentagonal panels 423 between adjacent hexagonal panels. The dome may then be coupled to a base.

It will be appreciated that whilst various aspects and embodiments of the aforementioned clamp have heretofore been described, the scope of the present invention is not limited to the particular arrangements set out herein and instead extends to encompass all arrangements, and modifications and alterations thereto, which fall within the scope of the appended claims. For example, whilst the various clamps disclosed herein are configured to enable three panels to be coupled together, the principles disclosed may readily be employed to devise a clamp for coupling two or more than three panels together. In addition, whilst it is preferred for the clamp to include spacers, it is envisaged that the spacers could be omitted. Lastly, whilst in the embodiments disclosed the spacers (if provided) and arms extend from the base, it is envisaged that they could extend from the cap, or that one of the arms and the spacers could extend from the base and the other extend from the cap.

Figure 28:
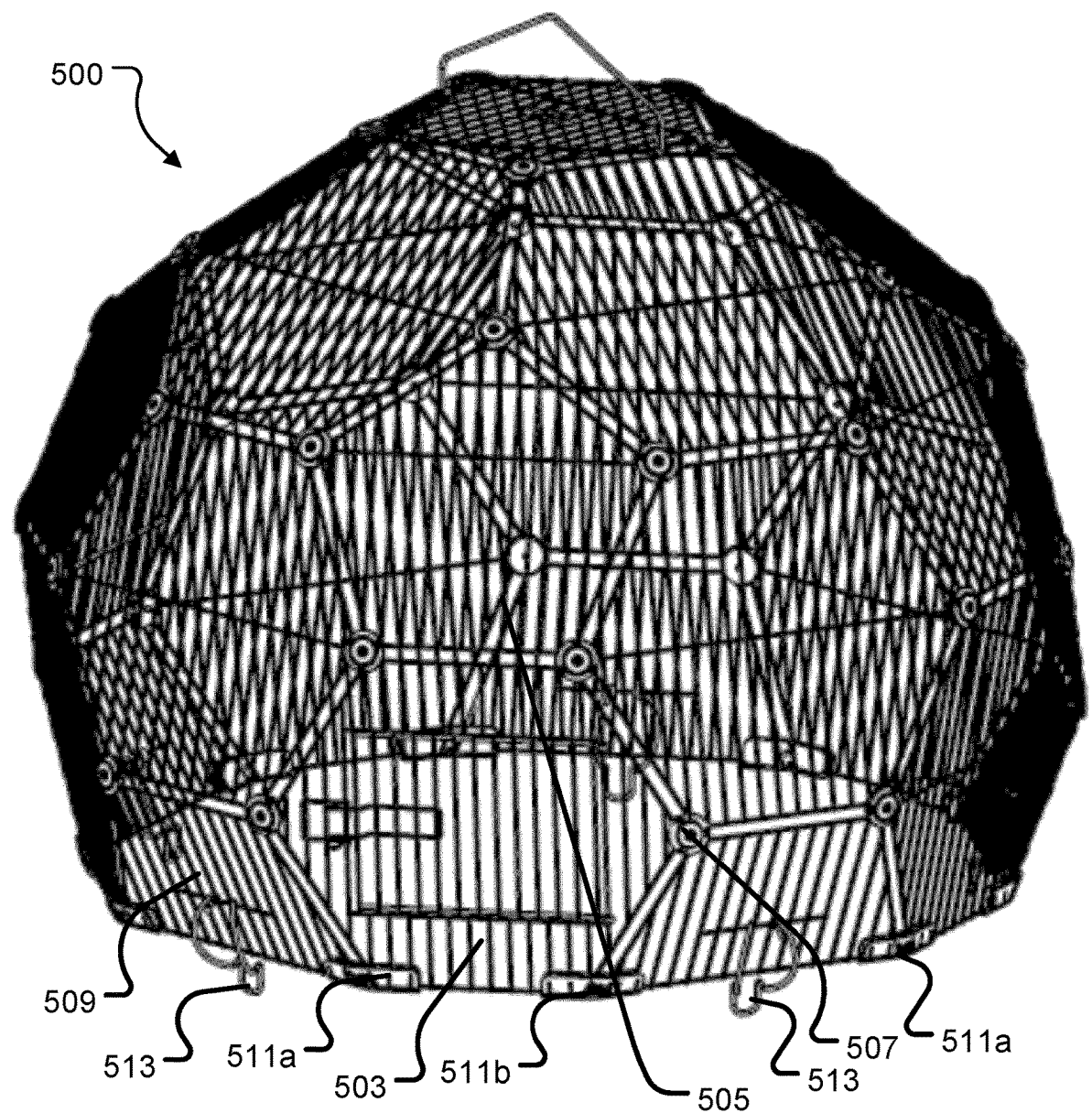
FIG. 28 is schematic representation of part of an animal enclosure in the form of a geodesic dome.

FIG. 28 is a schematic representation of part of an animal enclosure in the form of a geodesic dome 501. As described in our UK Patent No. 2563317, the dome 501 comprises a plurality of hexagonal panels 503 and a plurality of pentagonal panels 505 that have been coupled together by clamps 507 of the type described in our co-pending UK patent application number 1914230.6. Constructing a dome from individual substantially planar panels is advantageous as it greatly reduces the volume of the packaging required to transport such a cage to a user.

Around the periphery of the dome 501 that will be lowermost in use, the hexagonal panels 503 are interspersed with trapezoidal panels 509 that are each coupled at opposing ends to a hexagonal panel 503 by left and right handed clamps 511a, 511b respectively. The trapezoidal panels each carry a clip 513 that allows a base (not shown) to be removeably coupled to the dome 501.

Figure 29:
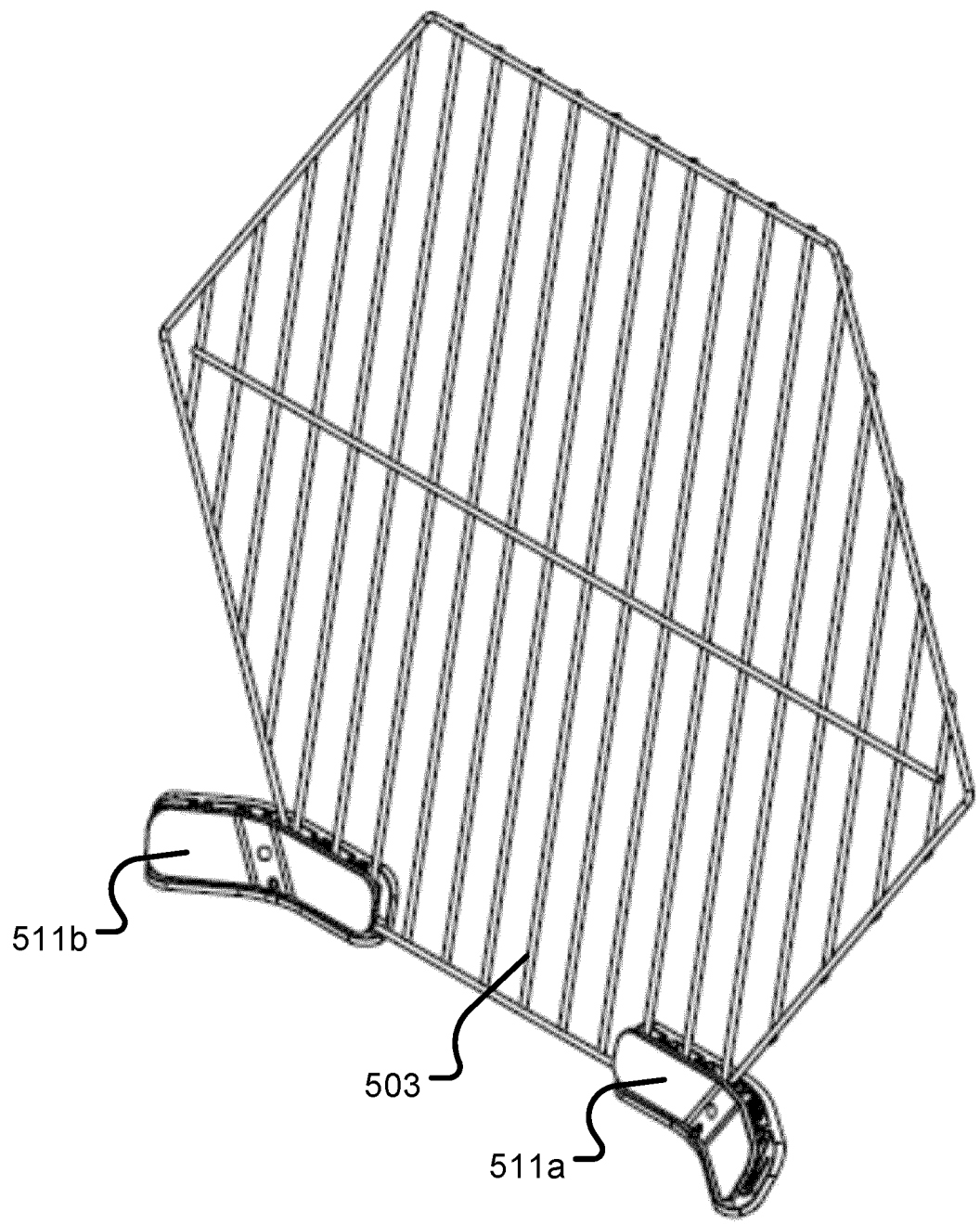
FIG. 29 is a schematic rear isometric view of a hexagonal mesh panel with two clamps attached thereto.
Figure 30:
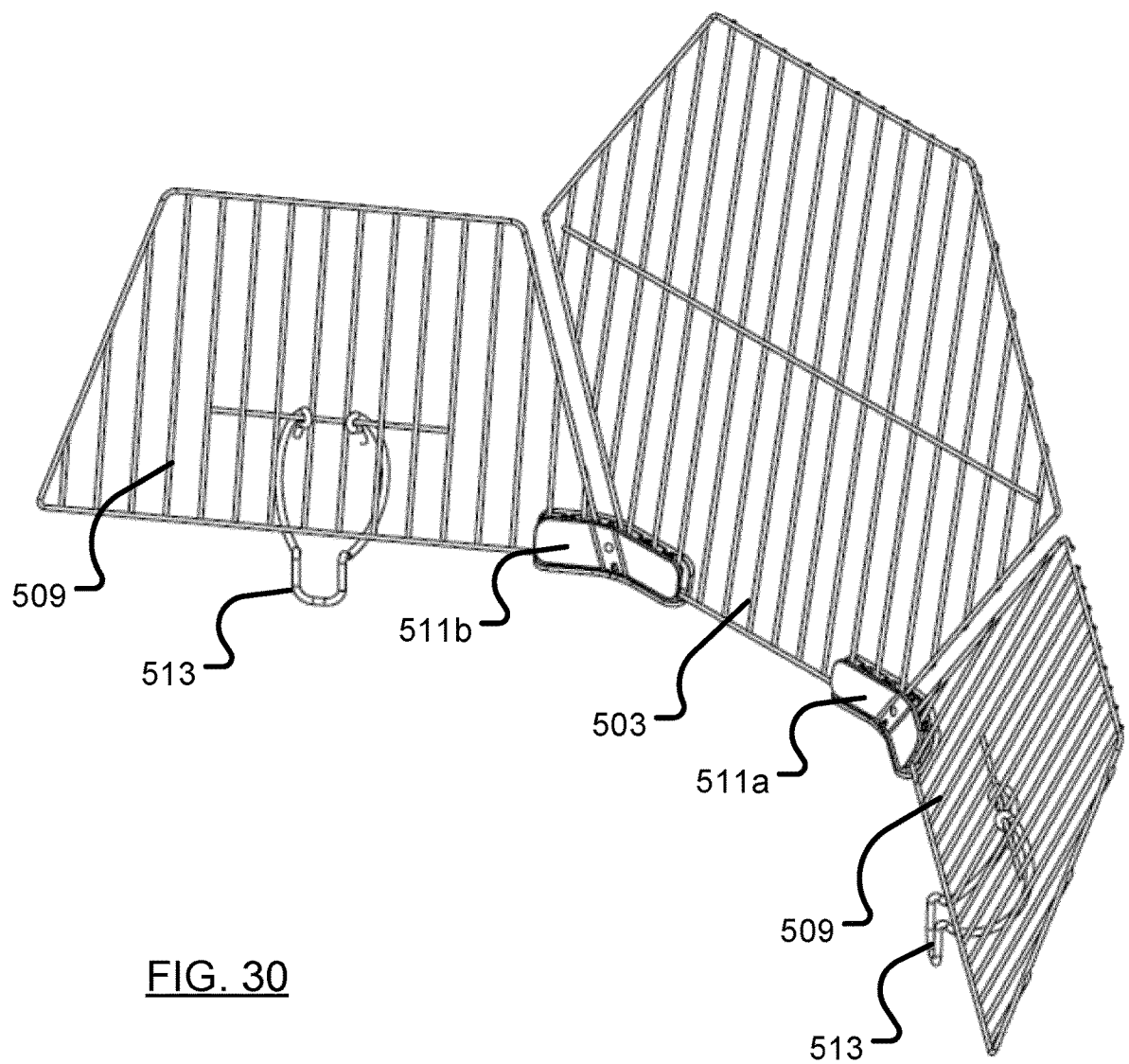
FIG. 30 is a schematic rear isometric view of a hexagonal mesh panel coupled at either end to a trapezoidal mesh panel.

In an illustrative assembly process for the dome 501, a user first push-fits a hexagonal mesh panels 503 into two clamps 511, as depicted in FIG. 29, so that a left-handed clamp 511a is attached to a panel apex at a left-hand end of one panel side and a right-handed clamp 511b is attached to a panel apex at a right-hand end of the same panel side. As shown in FIG. 29, when attached, the clamps extend in parallel from the left and right hand sides, respectively, of the panel. The user then push-fits an apex at one end of the longest side of a trapezoidal mesh panel into each of the clamps 511a, 511b as depicted in FIG. 30 attached to the hexagonal panel.

The user then continues to attached hexagonal and trapezoidal panels to one another using left and right handed clamps, as appropriate, until a generally circular panel assembly has been constructed. The user can then connect hexagonal and pentagonal panels, as shown in FIG. 28, preferably using clamps of the type described in our co-pending UK patent application number 1914230.6, to complete the assembly of the geodesic dome 501.

Figure 31:
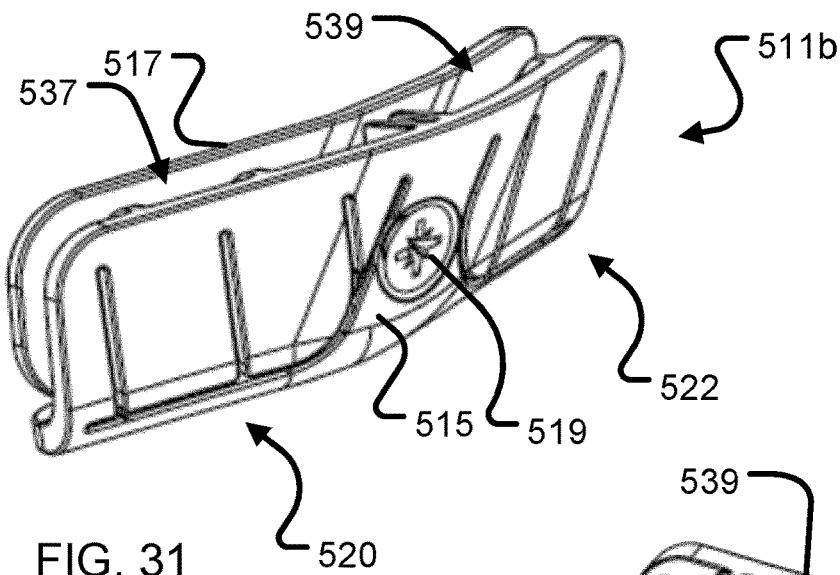
FIG. 31 is a schematic front isometric view of a clamp.
Figure 32:
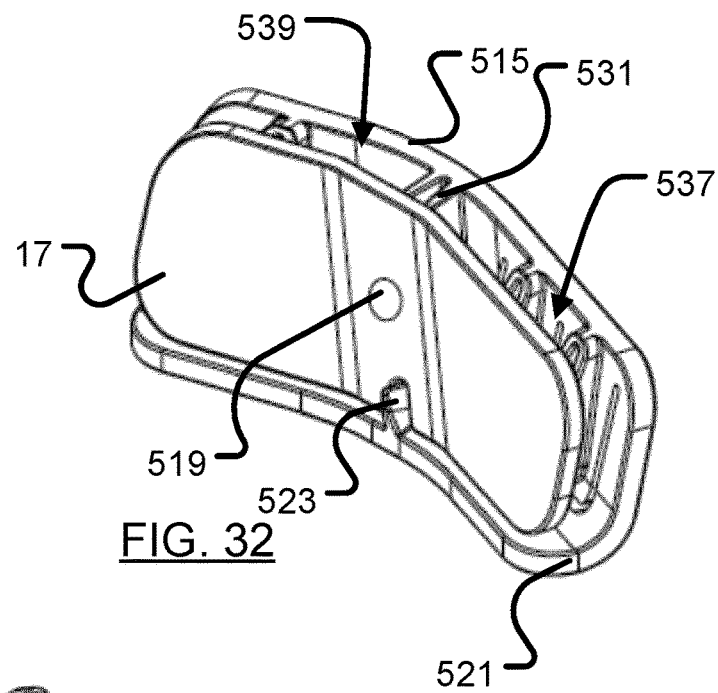
FIG. 32 is a schematic rear isometric view of the clamp depicted in FIG. 31.

FIG. 31 is a schematic front isometric view of a right-handed clamp 511b, or in other words, a clamp configured to be attached to the right hand end of the longest side of a trapezoidal wire mesh panel. The left-handed clamp 511a is functionally identical but structurally reversed with respect to the right-handed clamp, and for brevity will not further be described herein. FIG. 32 is a schematic rear isometric view of the clamp depicted in FIG. 31, and FIG. 33 is a schematic exploded front isometric view of the clamp depicted in FIGS. 31 and 32.

Figure 33:
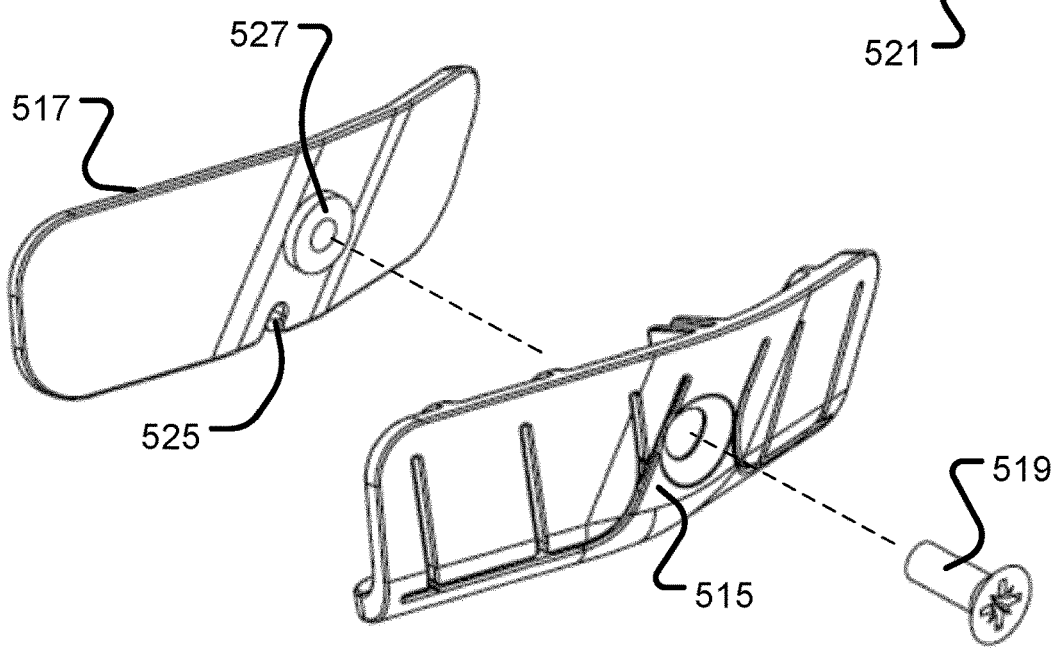
FIG. 33 is a schematic exploded front isometric view of the clamp depicted in FIGS. 31 and 32.
Figure 36:
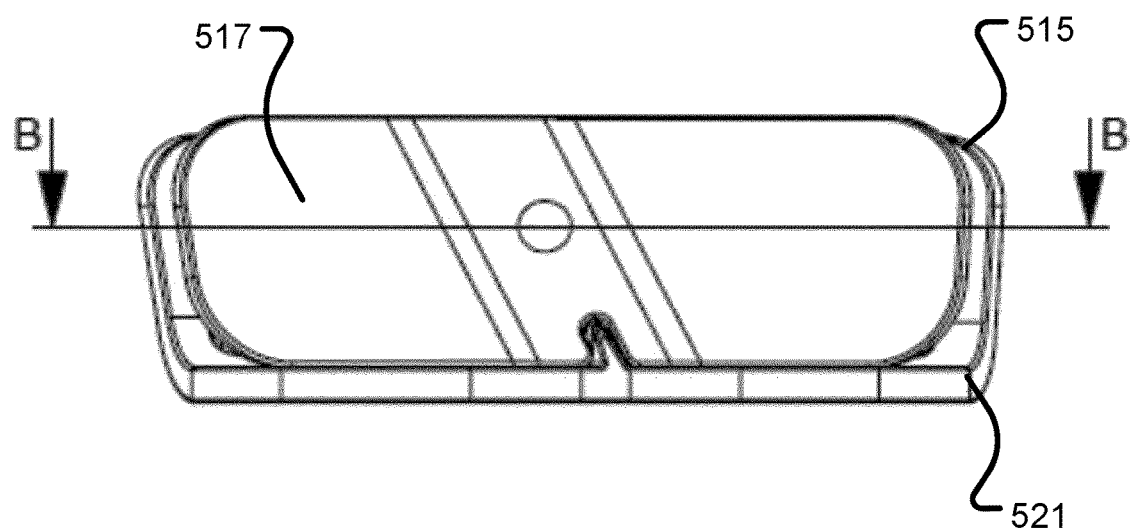
FIG. 36 is a schematic rear elevation of the clamp shown in FIGS. 31 to 35.

Referring now to FIGS. 31 to 33, the clamp 511b comprises first and second elongate panels 515, 517 that are coupled together by means of a releasable fixing 519, in this particular example a screw. The first elongate panel 515 is provided with a ledge 521 that extends generally perpendicularly from the panel and functions as a support for the second panel 517. An angled locating tab 523 extends from the ledge 521 and mates with a corresponding angled notch 525 in the second panel 517 to locate and align the second panel 517 with respect to the first 515 when the clamp is assembled. The second panel carries a formation for engaging with the fixing 519, in this particular example a nut 527.

In this particular embodiment, as the clamp is configured for connecting wire mesh panels to form a dome, the first and second panels are generally arcuate. In addition, as the hexagonal panels are significantly larger than the trapezoidal panels, the clamp is configured so that a first region 520 (in the arrangement depicted, the left-hand part of the clamp) of the clamp to one side of the fixing (the part of the clamp that couples to the hexagonal panel) is larger than a second region 522 (in this instance, the right-hand part of the clamp) of the clamp to the other side of the fixing. It will be appreciated, however, by persons skilled in the art that it is not essential for the clamp to be so configured. For differently shaped enclosures it may not be necessary for the clamp to be arcuate, it could instead be linear, angled (for example, right-angled) or curved. Similarly, depending on the panel sizes used to construct the enclosure, it may not be necessary for one region of the clamp to be a different size to the other, they could well be substantially the same size.

Figure 38:
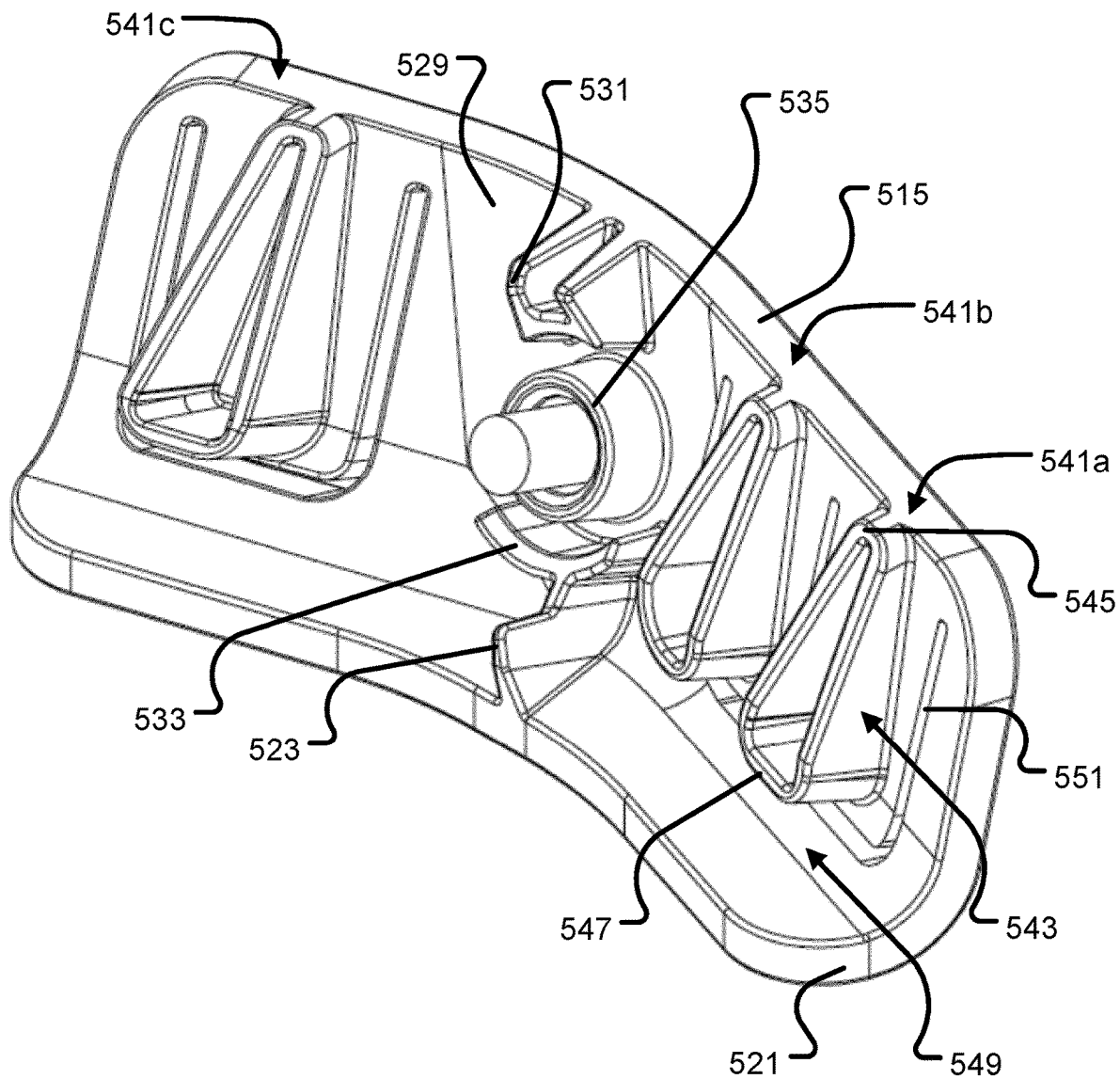
FIG. 38 is a rear isometric view of a component of the clamp depicted in FIGS. 31 to 37.

As is best shown in FIG. 38, a face 529 of the first panel 515 that faces towards the interior of the dome (when constructed) includes first and second spacers 531, 533 that abut against the second panel 517 when the panels are coupled together. A cowl 535, through which the fixing 519 extends for engagement with (in this instance) the nut 527, abuts against the nut 527 when the panels are coupled together. The spacers 531, 533, cowl 525 and nut 527 cooperate, when the panels are coupled together (as shown in FIGS. 31 and 32, for example) to space the panels 515, 517 from one another in a transverse direction (i.e. in a direction parallel to that in which the fixing is inserted) and thereby form first 537 and second 539 channels to either side of the fixing into each of which a panel apex of a respective panel can be fitted.

As the panel edges of the trapezoidal and hexagonal panels are set at an angle of less than 90 degrees to the horizontal, in this particular example of a geodesic dome, the first and second spacers and the cowl are arranged to lie along a line that extends at an angle from the ledge 521 substantially the same as the angle at which the edges of the trapezoidal and hexagonal panels are set to the horizontal. This allows the spacers and the cowl to fit between respective peripheral edges of the trapezoidal and hexagonal panels when the panels are push-fitted into the clamp.

Referring now to FIGS. 34 to 38, the first panel 515 includes a plurality of retainers 541a, 541b and 541c. In this particular example, the first region of the clamp includes two retainers 541a, 541b and the second region includes one retainer 541c but in other embodiments the clamp may include more or less retainers in each said region. The retainers function, as the name implies, to retain the wire mesh panels in the clamp once they have been push-fitted into the respective channels.

In this particular arrangement, each retainer comprises (as is best shown in FIG. 34) a ramped body 543 that extends from the face 529 of the first panel 515 that faces the interior of the enclosure in use, which ramped body increases transversely in size from a first point 545 proximate the channel entrances to a second point 547 proximate the ledge 521. The ramped body is sized longitudinally so as to leave a gap 549 between the retainer and the ledge 521 into which gap 549 a peripheral edge of a wire mesh panel can be fitted. As depicted, a wall of the retainer proximate the ledge 521 is generally parallel to the ledge so that the peripheral edge wire of a wire mesh panel tends to be retained in the gap 549.

Figure 37:
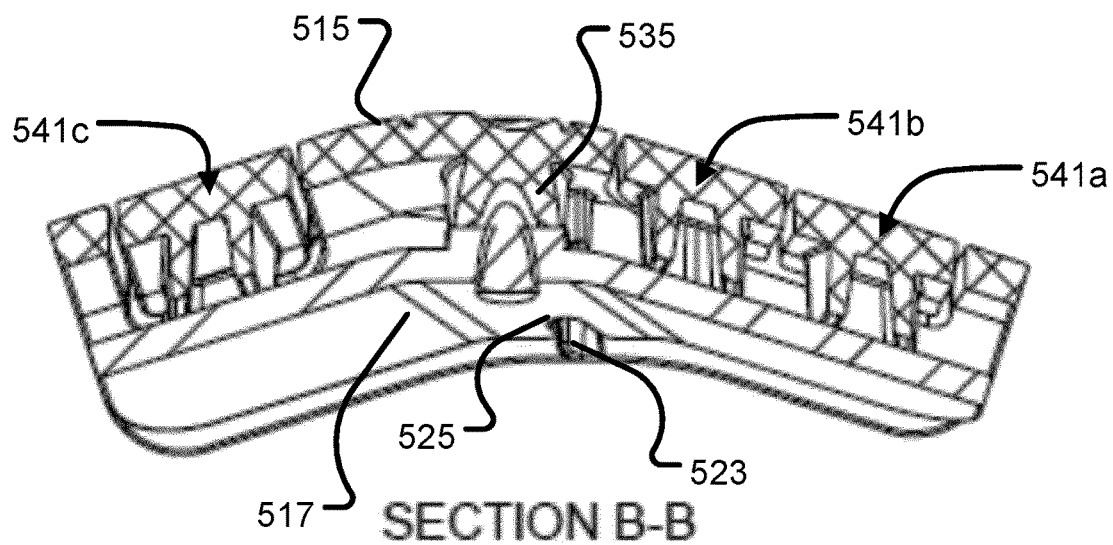
FIG. 37 is a cross-sectional view along the line B-B in FIG. 36.

As illustrated in FIG. 37, in an envisaged implementation the distance between the second point 547 of each said retainer and the face 529 of the first panel is less than the width of the channels when the clamp is assembled.

Each ramped body is partly circumscribed, in the particular example illustrated on three sides, by a slot 551 in the first panel so that the ramped body and the portion of the first panel 515 from which the ramped body extends can resiliently pivot into and out of the plane of the first panel 515, for example as a wire mesh panel is push fitted into the channel with which the retainer is associated.

In circumstances where more than one retainer is provided for a given channel, the clamp may be configured so that neighbouring retainers fit into neighbouring apertures in the wire mesh panel. Alternatively, if the apertures in the wire mesh panel are sufficiently large, more than one retainer may be fitted into a given aperture in the mesh.

As will be appreciated by persons skilled in the art, the arrangements described herein provide a particularly easy way for structures formed from wire mesh panels to be assembled. All a user need do is align an apex of a first panel with the first channel of the clamp, and push the panel into a first channel of the clamp (to drive the ramped body out of the plane of the panel) and past the ramped body (whereupon the ramped body will resiliently move to capture a wire loop of the panel in the gap). Once the first panel is secured in the clamp, an apex of a second panel can be aligned with the second channel and then push-fitted into the clamp. To release the panels from the clamp, a user need only loosen the fixing until the panels can be released from the clamp.

It will be appreciated that whilst various aspects and embodiments of clamps have heretofore been described, the scope of the present invention is not limited to the particular arrangements set out herein and instead extends to encompass all arrangements, and modifications and alterations thereto, which fall within the scope of the appended claims. For example, as aforementioned, depending on the structure that is to be assembled, the first and second panels of the clamp may not be arcuate. It is also not necessary for the regions of the clamp to include different numbers of retainers. The clamp could have the same number of retainers per region, for example one or two (or more) per region. Finally, whilst the arrangement disclosed by means of which the retainers can move is preferred (on the basis that manufacturing is simplified) it will be appreciated that any mechanism which enables the retainers to move resiliently as a wire panel is push-fitted into the clamp may instead be employed. For example, the retainer could comprise a plate that is hinged to the face 529 of the first panel at an end remote from the ledge and a resilient bias (such as a spring) between the plate and the face 529 of the first panel.

It should also be noted that whilst the accompanying claims set out particular combinations of features described herein, the scope of the present invention is not limited to the particular combinations hereafter claimed, but instead extends to encompass any combination of features herein disclosed.

Finally, it should be noted that any element in a claim that does not explicitly state "means for" performing a specified function, or "steps for" performing a specific function, is not to be interpreted as a "means" or "step" clause as specified in 35 U.S.C. Sec. 112, par. 6. In particular, the use of "step of" in the claims appended hereto is not intended to invoke the provisions of 35 U.S.C. Sec. 112, par. 6.

The invention claimed is:

1. A clamp for connecting a plurality of wire mesh panels together, the clamp comprising:
   a base;
   a cap releasably attachable to the base, and
   a plurality of arms extending axially along an axis from one of the base and the cap towards the other of the base and the cap;
   a plurality of spacers extending from one of the base and the cap toward the other of the base and the cap so that the spacers extend in parallel with the axis along which the arms extent;
   wherein the plurality of arms and the plurality of spacers are arranged so that each spacer lies between a pair of arms and each arm has a spacer to either side of the arm to define a plurality of channels within the clamp, wherein each one of the plurality of channels is located between one of the plurality of arms and an immediately adjacent spacer on either side of the arm;
   wherein each said channel is configured to accommodate a portion of a loop of a respective one of said plurality of panels to connect the panels together.

2. A clamp according to claim 1, wherein each of the plurality of spacers includes a notch configured to function as a seat for the cap.

3. A clamp according to claim 2, wherein each said arm co-operates with the plurality of spacers to either side of the arm in a circumferential direction to define said plurality of channels.

4. A clamp according to claim 1, in which the base is releasably attachable to the cap by means of a snap fit mechanism.

5. A clamp according to claim 4, in which the snap fit mechanism comprises a resilient protrusion defined in the base or the cap and an aperture defined in the other of the base and the cap.

6. A clamp according to any claim 1, wherein said plurality of arms include a ramped radially inwardly extending and radially outwardly facing face.

7. A clamp according to claim 1, wherein the base and the cap are releasably attachable by means of a threaded connection.

8. A clamp according to claim 7, in which the plurality of arms includes radially reinforcing walls.

9. A clamp according to claim 1, wherein the plurality of spacers further comprising three spacers, each of the three spacers extending axially from the base or the cap.

10. A clamp according to claim 9, wherein each arm and spacer are separated circumferentially by a distance d, the distance d being larger than a diameter Ø of the portion of the loop of the panel.

11. A clamp according to claim 10, in which each arm and/or each spacer terminates in at least one circumferential tab, such that each arm and each spacer is also separated circumferentially by a distance c, wherein the distance c is between 1 and 1.2 times the diameter Ø of the portion of the loop of the panel.

12. A clamp for connecting a plurality of wire mesh panels together, the claim comprising:
   a base;
   a cap releasably attachable to the base, and
   a plurality of arms provided between the base and the cap to define a plurality of channels within the clamp; wherein each said channel is configured to accommodate a portion of a loop of a respective one of said plurality of panels to connect the panels together;
   wherein said base comprises a minor base portion and a major base portion, a resilient bias being provided between said major and minor base portions so that said major base portion can move towards said minor base portion against said bias.

13. A clamp according to claim 12, comprising a fixing for coupling said minor base portion to said cap, the fixing extending through said resilient bias and said major base portion.

14. A clamp according to claim 13, wherein tightening the fixing draws the minor base portion and the major base portion towards the cap and compresses the resilient bias.

15. A wire mesh cage including a plurality of panels coupled together by a clamp according to claim 1.

16. A wire mesh cage according to claim 15, wherein the panels form at least part of a geodesic dome when coupled together by said clamp.

17. A wire mesh cage according to claim 16, wherein said geodesic dome includes a plurality of hexagonal panels and/or a plurality of pentagonal panels.

18. A wire mesh cage according to claim 15, further comprising a base that is configured to be coupled to the cage to form an enclosure.

19. A clamp for connecting a plurality of wire mesh panels together, the clamp comprising:
   a base;
   a cap releasably attachable to the base;
   a plurality of arms extending axially along an axis from one of the base and the cap towards the other of the base and the cap; and
   a plurality of spacers extending from one of the base and the cap toward the other of the base and the cap, said plurality of spacers being arranged so that each arm has a spacer to either side of the arm in a circumferential direction and each spacer lies between a pair of arms;
   wherein the plurality of arms each co-operate with spacers to either side of each arm in a circumferential direction to define a channel within the clamp; each said channel being configured to accommodate a portion of a loop of a respective one of said plurality of panels to connect the panels together.

* * * * *